US011707061B2

(12) United States Patent
Elrod

(10) Patent No.: US 11,707,061 B2
(45) Date of Patent: Jul. 25, 2023

(54) AIR FLOW CONTROL BLIND

(71) Applicant: Scott A. Elrod, Lake Jackson, TX (US)

(72) Inventor: Scott A. Elrod, Lake Jackson, TX (US)

( * ) Notice: Subject to any disclaimer, the term of this patent is extended or adjusted under 35 U.S.C. 154(b) by 82 days.

(21) Appl. No.: 17/378,515

(22) Filed: Jul. 16, 2021

(65) Prior Publication Data

US 2023/0013249 A1 Jan. 19, 2023

(51) Int. Cl.
*E04H 15/16* (2006.01)
*A01M 31/02* (2006.01)
*F24F 7/003* (2021.01)
*E04H 15/00* (2006.01)
*F24F 7/00* (2021.01)

(52) U.S. Cl.
CPC ......... *A01M 31/025* (2013.01); *E04H 15/001* (2013.01); *E04H 15/16* (2013.01); *F24F 7/003* (2021.01); *F24F 2007/001* (2013.01); *F24F 2007/0025* (2021.01)

(58) Field of Classification Search
CPC .................................................. E04H 15/16
See application file for complete search history.

(56) References Cited

U.S. PATENT DOCUMENTS

| 359,796 | A | * | 3/1887 | Lewis | E04H 15/14 |
| | | | | | 135/93 |
| 2,314,830 | A | * | 3/1943 | Hunter | G03D 17/00 |
| | | | | | 135/93 |
| 3,024,717 | A | * | 3/1962 | Rozek | F24F 7/00 |
| | | | | | 135/117 |
| 5,341,610 | A | * | 8/1994 | Moss | E04H 1/1205 |
| | | | | | 52/80.1 |
| 6,397,869 | B1 | * | 6/2002 | Jennings | E04H 15/32 |
| | | | | | 135/93 |
| 7,565,909 | B2 | * | 7/2009 | Reis | E04H 15/44 |
| | | | | | 428/17 |
| 7,614,415 | B1 | * | 11/2009 | Wehner | A01G 9/16 |
| | | | | | 135/126 |
| 2005/0120649 | A1 | * | 6/2005 | Choi | E04H 15/14 |
| | | | | | 52/204.5 |

(Continued)

OTHER PUBLICATIONS

Raines, Christopher, "How to Increase the Barometric Pressure in a Home," retrieved from https://sciencing.com/increase-barometric-pressure-home-12108795.html and dated Apr. 25, 2017.

(Continued)

*Primary Examiner* — Noah Chandler Hawk
(74) *Attorney, Agent, or Firm* — Dorsey & Whitney LLP

(57) ABSTRACT

Embodiments disclosed herein relate to air flow control blinds or tents useful for controlling scents emitted therefrom. The air flow control blinds can include walls, a roof, windows in the walls, and at least one directional vent disposed on the walls, where the at least one directional vent includes an inlet on the inner surface of the blind and an outlet fluidly connected to the inlet, the outlet facing downward on the outer surface of the blind to direct fluids flowing therethrough towards the ground. The air flow control blinds may include one or more roof vents adjacent to the walls on the roof. The air flow control blind includes at least one oxidant generator mount on one or more of the roof or the walls to mount an oxidant generator thereon. Blind systems can include a portable oxidant generator positioned in the blind.

36 Claims, 10 Drawing Sheets

(56) References Cited

U.S. PATENT DOCUMENTS

| | | | | |
|---|---|---|---|---|
| 2013/0125944 A1* | 5/2013 | Elrod | .................. | A01M 31/025 |
| | | | | 135/96 |
| 2014/0202510 A1* | 7/2014 | Tarter | ...................... | E04H 15/14 |
| | | | | 135/96 |
| 2017/0335594 A1* | 11/2017 | Stariha | .................... | E04H 15/14 |

OTHER PUBLICATIONS

Bagbee et al., "Enabling better global research outcomes in soil, plant & environmental monitoring," ICT International, retrieved on Dec. 14, 2021 from https://www.ictinternational.com/casestudies/understanding-oxygen-in-air/.

* cited by examiner

AIR FLOW CONTROL BLIND

BACKGROUND

Animals such as deer, bears, elk, moose, and the like are particularly weary of human scents and will flee when detecting a human scent. Human scents can include odors synonymous with humans such as from sweat, feet, breath, clothing, detergents, soap, fragrances, equipment, or the like. Natural scents such as animal urine, animal musk, pine scent, or the like are commonly used in an attempt to mask or cover human scent by hunters. However, such natural scents do not eliminate or reduce the human scent.

Hunting blinds are used by hunters to visually conceal themselves from animals. Blinds may assist in visual concealment, but they do not, however, conceal human scent. Some hunters use natural scents on or in the blind in an attempt to cover their human scent.

SUMMARY

Embodiments of the invention relate to air flow control blinds, blind systems, and methods useful for controlling scent emitted therefrom.

In an embodiment, a hunting blind is disclosed. The hunting blind includes one or more walls defining an interior region therebetween, the one or more walls including an inner surface and an outer surface. The hunting blind includes a roof at least partially enclosing the interior region. The hunting blind includes one or more windows in the one or more walls. The hunting blind includes at least one directional vent disposed on the one or more walls, the at least one directional vent including an inlet on the inner surface and an outlet facing downward on the outer surface, the outlet being in fluidly connected with the inlet by a channel therebetween. The hunting blind includes at least one oxidant generator mount on one or more of the roof or the one or more walls.

In an embodiment, a blind system is disclosed. The blind system includes a hunting blind. The hunting blind includes one or more walls defining an interior region therebetween, the one or more walls including an inner surface and an outer surface. The hunting blind includes a roof at least partially enclosing the interior region. The hunting blind includes one or more windows in the one or more walls. The hunting blind includes at least one directional vent disposed on the one or more walls, the at least one directional vent including an inlet on the inner surface and an outlet facing downward on the outer surface, the outlet being in fluidly connected with the inlet by a channel therebetween. The hunting blind includes at least one oxidant generator mount on one or more of the roof or the one or more walls. The blind system includes at least one portable oxidant generator disposed in the at least one oxidant generator mount.

In an embodiment, a method of controlling scent in and around a hunting blind is disclosed. The method includes occupying a hunting blind. The hunting blind includes one or more walls defining an interior region therebetween, the one or more walls including an inner surface and an outer surface. The hunting blind includes a roof at least partially enclosing the interior region. The hunting blind includes one or more windows in the one or more walls. The hunting blind includes at least one directional vent disposed on the one or more walls, the at least one directional vent including an inlet on the inner surface and an outlet facing downward on the outer surface, the outlet being in fluidly connected with the inlet by a channel therebetween. The hunting blind includes at least one oxidant generator mount on one or more of the roof or the one or more walls. The method includes operating at least one portable oxidant generator disposed in the at least one oxidant generator mount.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to blinds or tents incorporating an air flow control system to control scent emitted therefrom. The blind includes one or more walls, a roof, windows in the one or more walls, and at least one directional vent disposed on the one or more walls, where the at least one directional vent includes an inlet on the inner surface of the blind and an outlet fluidly connected to the inlet, the outlet facing downward on the outer surface of the blind to direct fluids flowing therethrough towards the ground. In an embodiment, the air flow control blind includes one or more roof vents on the roof adjacent to the one or more walls to remove air from an interior of the blind therethrough. The air flow control blind includes at least one oxidant generator mount on one or more of the roof or the one or more walls to mount an oxidant generator thereon.

The at least one directional vent may have a portable oxidant generator mounted above it and directed therein to remove air from within the interior region of the blind, treat it with oxidants to remove scent(s) therefrom, and output the treated air to the environment outside of the blind. Likewise, the one or more roof vents include an openable flap on the roof. A roof mount may be incorporated into or may be adjacent to the one or more roof mounts for mounting a portable oxidant generator thereto. The roof vent and roof mount allow air to be removed from the interior region, to be treated to remove scents therefrom by the portable oxidant generator, and to be output into the environment outside of the blind. By treating the air exiting the blind through the vents, the blind systems disclosed herein allow removal of scents synonymous with humans from the air exiting the blind without filling the blind with oxidants. Accordingly, the blinds disclosed herein may be used to selectively and simultaneously control the amount of air exiting the blind and control the removal of human scents from the air in (and exiting) the blind all while keeping the amount of oxidants (e.g., ozone) within the blind below levels accepted as safe for exposure to humans.

Figure 1:
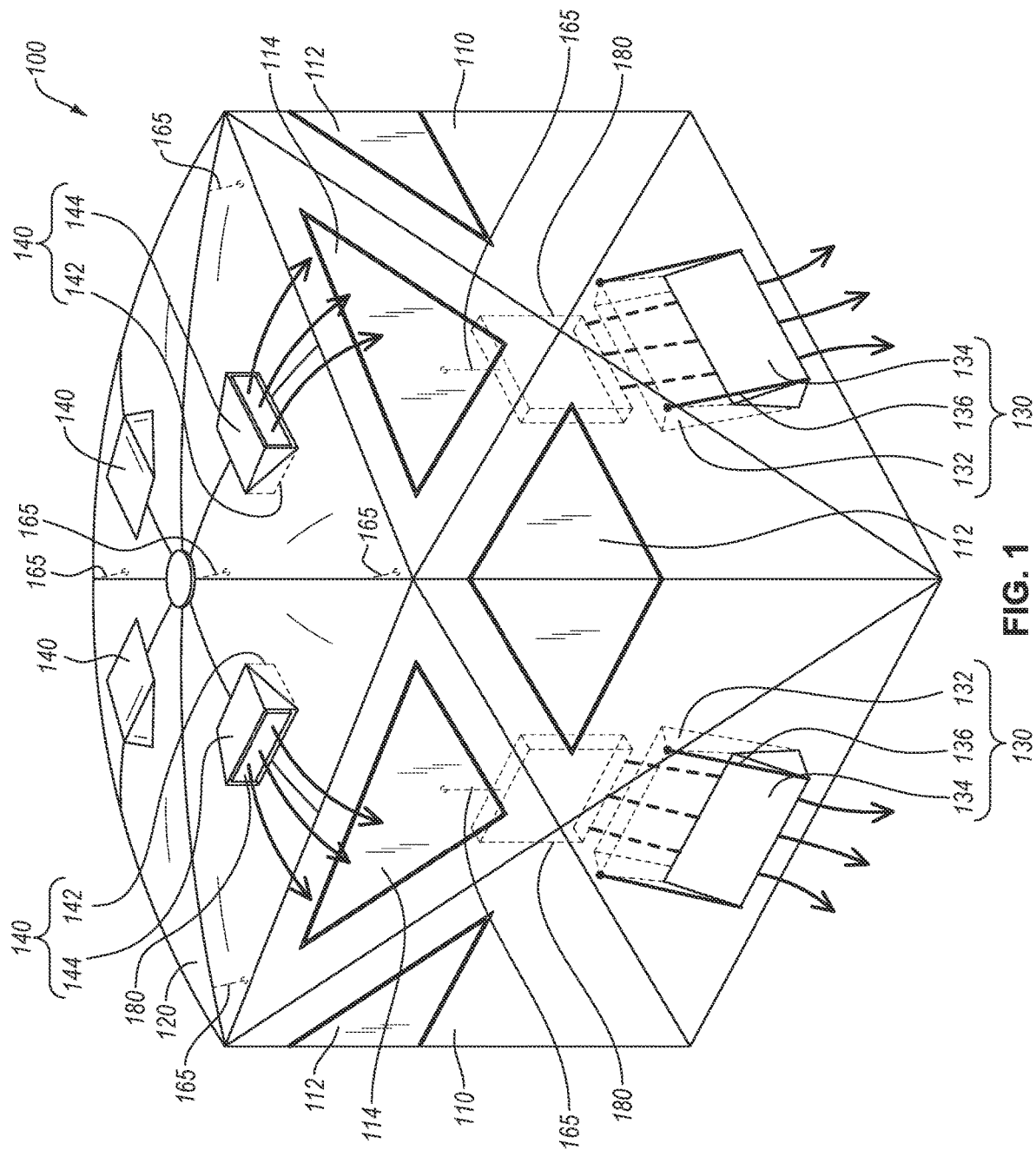
FIG. 1 is an isometric view of a hunting blind, according to an embodiment.
Figure 2:
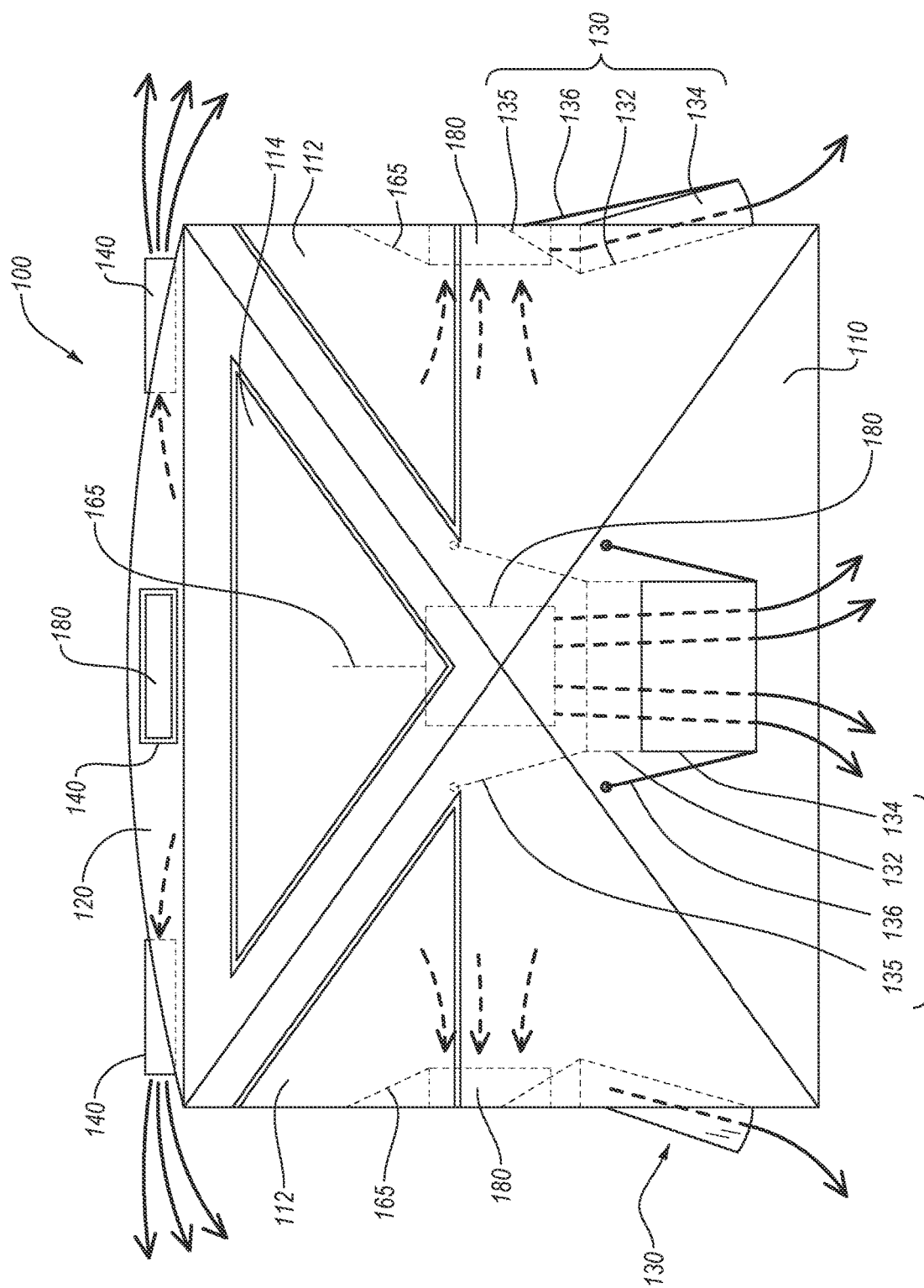
FIG. 2 is a side view of the hunting blind of FIG. 1, according to an embodiment.
Figure 3:
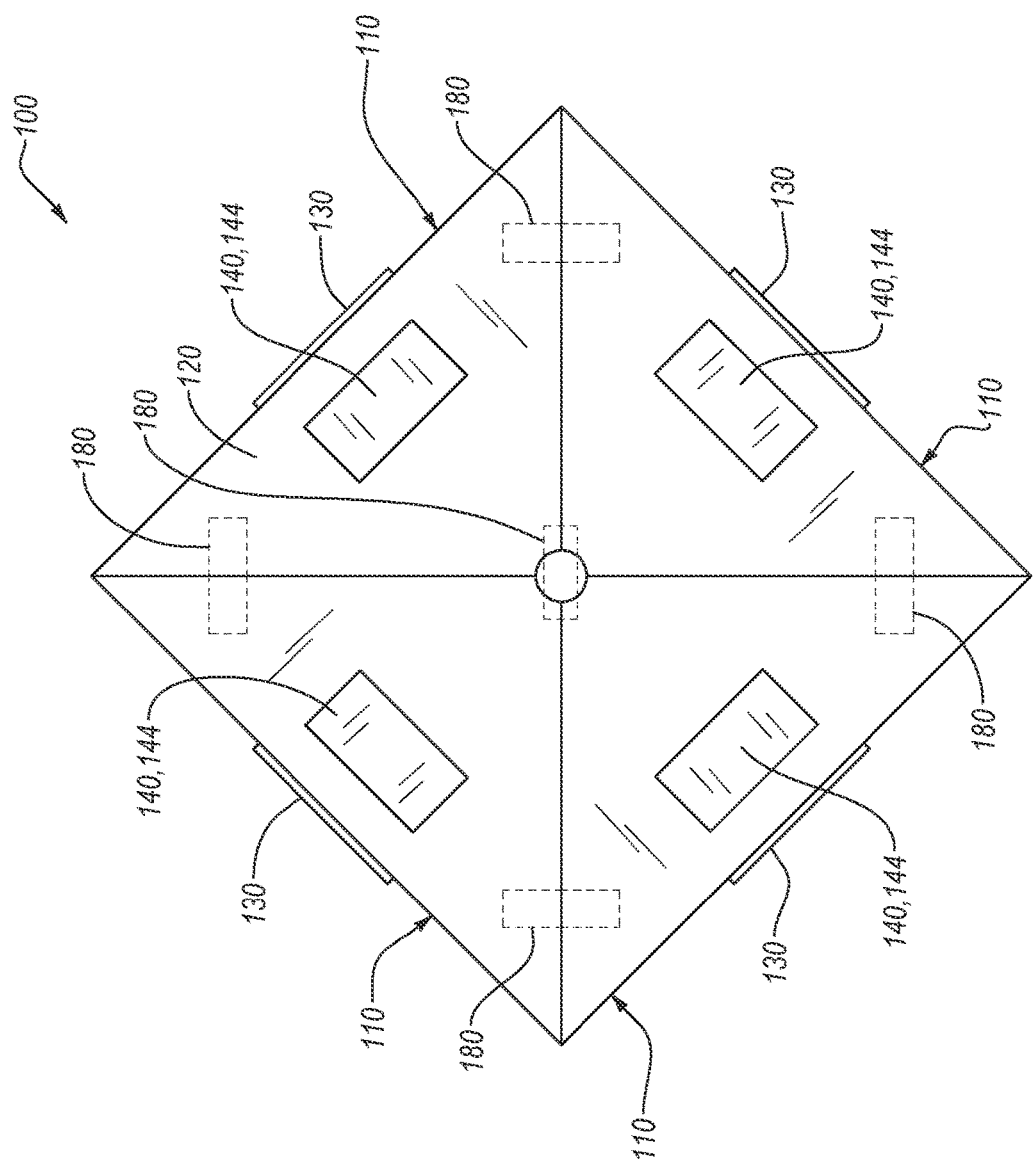
FIG. 3 is a top view of the hunting blind of FIG. 1, according to an embodiment.
Figure 4:
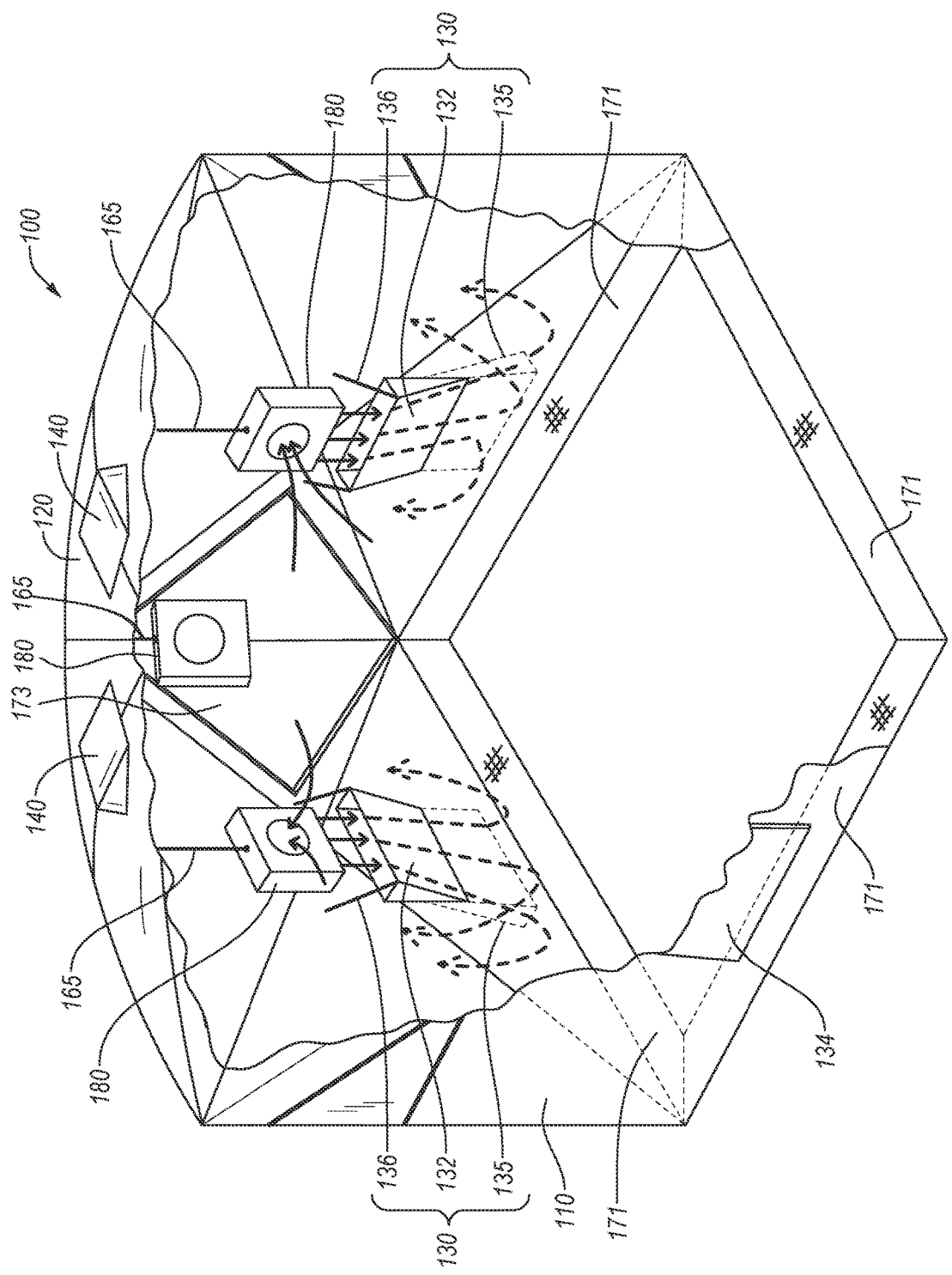
FIG. 4 is a partial cutaway view of the hunting blind of FIG. 1, according to an embodiment.

In a simple form, the blinds disclosed herein include a hunting blind with one or more vents thereon sized, shaped, and positioned to control the amount and direction of airflow therethrough. FIG. 1 is an isometric view of a hunting blind 100, according to an embodiment. FIG. 2 is a side view of the hunting blind 100 of FIG. 1, according to an embodiment. FIG. 3 is a top view of the hunting blind 100 of FIG. 1, according to an embodiment. FIG. 4 is a partial cutaway view of the hunting blind 100 of FIG. 1, according to an embodiment. The hunting blind includes one or more walls 110 defining an interior region bound therebetween, a roof 120 at least partially enclosing the interior region, one or more windows 112 and 114 in the one or more walls 110, at least one directional vent 130 disposed on the one or more walls 110, and at least one oxidant generator mount on one or more of the roof 120 or the one or more walls 110. The at least one directional vent 130 and the one or more roof vents 140 may be utilized to selectively control (both the amount and direction of) the flow of air out of the hunting blind 100.

The one or more walls 110 may be sized and shaped to accommodate one, two, three, or more humans in the interior region of the blind 100. The one or more walls 110 may include a frame and a cover thereon. The cover may include one or more fabric or polymer sheets. The fabric or polymer may be at least partially resistant to oxidation. For example, the cover may include a fabric of polymer fibers such as one or more of polypropylene, polyethylene, polyvinylchloride, polystyrene, polymethyl methacrylamide, polyolefins, or the like. One or more portions of the cover may be camouflage in color on the outer surfaces thereof. The cover may be camouflage or black on the inner surfaces thereof. The cover may include more than one layer, such as an inner layer and outer layer. The cover may also form at least a portion of the roof 120.

The cover may include a plurality of panels sewn, welded, or otherwise connected together, such as a plurality of side panels, windows, a door, one or more roof panels, and a plurality of vents. The cover may include one or more panels of materials that differ from each other, such as screen or mesh materials on the windows and tighter weaved materials in the roof and low portions of the blind. The cover may include one or more panels of a mesh fabric. The cover may include one or more panels of a one-way see through fabric (from inside to outside), such as a perforated mesh fabric or the like. One or more portions of the cover (e.g., roof panels) may be treated with waterproofing materials, such as a waterproof coating.

At least some of the panels of the cover may be joined by a resealable member such as a zipper, hook and loop fasteners, snaps, clips, magnets, a hydrogel adhesive, or the like. Accordingly, one or more panels may be opened to form a port, window, or door.

The frame may include a plurality of poles or spring loaded members. For example, the blind may be substantially cuboid and the frame may include poles defining the individual walls 110 and the roof 120. The poles may be arranged as one or more of vertical corner posts, diagonal cross members, roof supports, or the like. The poles may be anchored by one or more hubs. For example, a central hub may be positioned in a central portion of a wall 110 and the poles may extend therefrom to the corners of the wall 110. The cover may be disposed over, and optionally placed in tension by, the poles. The cover may attach to the poles via loops, ties, tubes, hooks, or other retention structures on the inner surface of the cover. For example, the cover at one or more points of the roof and walls may be sewn around the one or more poles (e.g., have tubes sewn therein to accommodate the poles therethrough). The roof 120 may connect to the walls 110 via the cover. The poles in the roof 120 may be connected to the poles in the wall 110 via the cover or by hubs connected to the ends of the respective poles. Such hubs may include a hinged connection to the ends of the poles. The hinged connection may be lockable to retain the poles in position and make the blind frame rigid. Such hubs may be used in pop-up configurations, where the frame and cover a connected through one or more hubs and can pop-up from a closed configuration to an open configuration by a user.

As disclosed above, the one or more walls 110 may include one or more windows 112 or 114 therein. The one or more windows 112 may be positioned at or near the edges of the walls 110 (e.g., corners of the blind 100) and the one or more windows 114 may be positioned in a middle portion of a wall 110. The windows may be constructed from a portion of the cover having the resealable member disposed around the outer portions thereof to hold the panel of the cover onto the wall 110, such that when unsealed, the panel of the cover may be at least partially removed. For example, a panel may be held in place by a zipper and when unzipped may be opened to form a window through which the outside environment is in fluid communication with the interior region of the blind.

In some examples, the windows 112 or 114 may include a flap of fabric disposed over an opening in the cover on the wall 110, such as a piece of fabric connected to the wall 110 at a top, bottom, or side of an opening in the cover. The piece of fabric may be maintained in a position to cover the opening by a releasable member such as a button, snaps, straps, hooks, clips, hook and loop fasteners, magnets, or the like. The flap of fabric may be positioned on the inner surface of the wall 110. In some examples, the piece of fabric forming the window 112 or 114 may be maintained in a position to cover the opening by a plurality of slides, which may be moved up or down to open the window 112 or 114. For example, the slides may be anchored to the wall 110 in a track thereon that extends vertically on the wall 110 past the lateral extent of the window 112 or 114 and the slides may be connected to the window 112 or 114 along the lateral edges thereof.

In some examples, blind 100 includes windows 112 or 114 on only a limited number of walls 110 such as on one, two, or three of the walls 110. In such examples, the walls 110 without the windows 112 or 114 may include a door or solid panels without see-through materials thereon. The one or more windows 112 or 114 may be located on walls 110 opposite to the one or more walls 110 that include the at least one directional vent 130 thereon. Accordingly, air from inside of the blind 100 may be output behind the occupant of the blind (assuming the occupant is positioned by the windows).

While shown as triangular, the windows 112 or 114 may be any shape (e.g., rectangular, circular, ovoid, etc.) and size. The windows 112 or 114 may be positioned at any location on the one or more walls 110, not merely those depicted in the figures.

The one or more walls 110 may include any number of walls, such as one for a cylindrical coiled pop-up blind, three for a blind with a triangular footprint, four for a blind with a rectangular (e.g., square) footprint, five for a blind with a pentagonal footprint, or more. The one or more walls 110 (e.g., cover) may include one or more holes, straps, cords, grommets, or analogous structures for receiving a stake. Accordingly, the one or more walls 110 may be staked to the ground to prevent movement of the blind.

The one or more walls 110 may include at least one oxidant generator mount 165 disposed thereon. For example, the at least one oxidant generator mount 165 may include one or structures for mounting a portable oxidant generator 180 thereon. The at least one oxidant generator mount 165 may include one or more of cords, hangers, straps, boxes, or bags to hold a portable oxidant generator 180. For example, the at least one oxidant generator mount 165 may include a plurality of cords hanging from the one or more of the walls 110 and roof 120 in the interior region, where the plurality of cords form or include an attachment for securing a portable oxidant generator 180 thereon.

As discussed in more detail below, the one or more walls 110 may include at least one directional vent 130 disposed thereon such as in a lower region thereof. The one or more oxidant generator mounts 165 may be positioned proximate to (e.g., above) the at least one directional vent 130 to allow air and oxidant(s) emitted from a portable oxidant generator 180 mounted thereto to flow through the at least one directional vent 130. For example, the at least one oxidant generator mount 165 may be located above and adjacent to an inlet of the at least one directional vent 130 on the inner surface of the wall 110 effective to allow oxidant output therefrom to flow directly into the inlet and out of the blind 100.

As shown in FIG. 4, the blind 100 may include a skirt 171 extending inwardly a distance into the interior region from a lowest extent of the one or more walls 110. The skirt 171 may be formed from any of the materials of the cover disclosed herein. The skirt 171 may include a material (e.g., layer) that is selected to dampen noise when stepped on or moved, such as a felt, canvas, carpeting, or the like. The skirt 171 may extend inward from the bottom of the one or more walls 110 at least 1 cm, such as 1 cm to 50 cm, 1 cm to 10 cm, 10 cm to 20 cm, more than 20 cm, or less than 50 cm from the bottom of the one or more walls 110. In some examples, the skirt 171 may be a complete floor extending between and connecting to the one or more walls 110. For example, the skirt 171 may completely separate an occupant in the blind 100 from directly contacting the ground regardless of position in the blind 100. The skirt 171 may be affixed to the one or more walls 110, such as sewn, welded, or adhered to the one or more walls 110. The skirt 171 may be temporarily affixed to the one or more walls 110, such as via one or more zippers, hook and loop fasteners, buttons, magnets, or the like, to the one or more walls 110. Accordingly, the skirt 171, may be selectively used or omitted by a user. The skirt 171 may aid in preventing air from escaping out of the interior region by passing under the bottom of the one or more walls 110. The skirt 171 may include one or more holes, straps, cords, grommets, or analogous structures for receiving a stake. Accordingly, the skirt 171 may be anchored to the ground to prevent movement of the same.

As shown in FIG. 4, the one or more walls 110 may include a door 173 therein. The door 173 may be similar identical to the windows 112 or 114 in one or more aspects. For example, the door 173 includes a panel of material that is connected to the cover around a periphery of the panel and is resealably attached thereto, such as by a zipper, hook and loop fasteners, or the like. The door 173 may be larger than the windows 112 or 114. For example, the door is sized and shaped to allow adult sized humans to pass therethrough. The door may be located nearer the bottom of the wall 110 than the windows 112 or 114 to allow a person to step through the door 173 to enter or exit the blind 100 when the door 173 is opened.

The roof 120 at least partially encloses the interior region in the blind. The cover of the roof may include a one or more panels connected together. The cover of the roof may include a waterproof material such as one or more of a fabric that is waterproof, a coating that is water proof, a film (e.g., plastic sheeting). The fabric may include any of the fabrics for the cover disclosed herein. The cover of the roof 120 may be attached to the cover for the one or more walls 110, such as sewn, welded, adhered, zipped, integrally formed with, or the like to the one or more walls 110.

The frame of the roof 120 may include a plurality of poles to support the cover of the roof 120. The frame in the roof may include a central hub with poles extending therefrom to the upper corners of the one or more walls 110. In some examples, the poles in the roof may extend from a first corner of a first wall 110 to a first corner of a second wall 110 substantially opposite the first wall 110 (e.g., diagonally across the roof 120) and from a first corner of a third wall 110 to a first corner of a fourth wall 110 substantially opposite the third wall 110. The poles of the roof 120 may be in compression and bend to form an at least partially dome. Any configuration of poles may be used to form a roof 120 that prevents collapse of the same in the case of rain or wind.

The roof 120 may include one or more oxidant generator mounts 165 for mounting a portable oxidant generator 180 thereon. The one or more roof oxidant generator mounts 165 may be positioned at or adjacent to the corners of the roof 120 a central point in the roof 120 or any points therebetween. The portable oxidant generator mounts 165 may be located in the roof 120 or one or more walls 110 to position an output of the portable oxidant source 180 mounted thereto in a direction that allows the oxidant emitted therefrom to pass through (e.g., directly out of) the window 112 or 114. For example, at least some of the windows 112 or 114 may have at least one oxidant generator mount 165 adjacent thereto (e.g., above the window). In such examples, the input or intake of the portable oxidant generator 180 may be positioned in a direction to intake air from inside of the blind 100 and output the oxidant generated therein through the window 112 or 114. Suitable oxidant generator mounts 165 may include one or more cords, hangers, straps, boxes, or bags sized, shaped, and positioned to direct the output of the portable oxidant generator 180 toward or out of a window 112 or 114 when mounted thereto. For example, one or more straps may be attached to poles or rods in the roof 120 and the straps may attach to the portable oxidant generator 112 in a way such that a first side of the portable oxidant generator 180 having an intake thereon faces into the interior of the blind 100 and a second side thereof having an output thereon faces or is directed out of the window 112 or 114.

The at least one directional vent 130 may be positioned on the one or more walls 110 in a lower region thereof, such as below a midway point of the height of the walls 110. Referring to FIGS. 1-4, the at least one directional vent 130 includes an inlet 132 on the inner surface of the wall 110 and an outlet 134 facing downward on the outer surface of the wall 110. The inlet 132 is fluidly connected with the outlet 134 by an opening therebetween. In use, the inlet 132 is opened and the outlet 134 is opened to provide egress from interior region of the blind to the outside environment for air and oxidants being output from the portable oxidant generator 180.

Figures 5, 6:
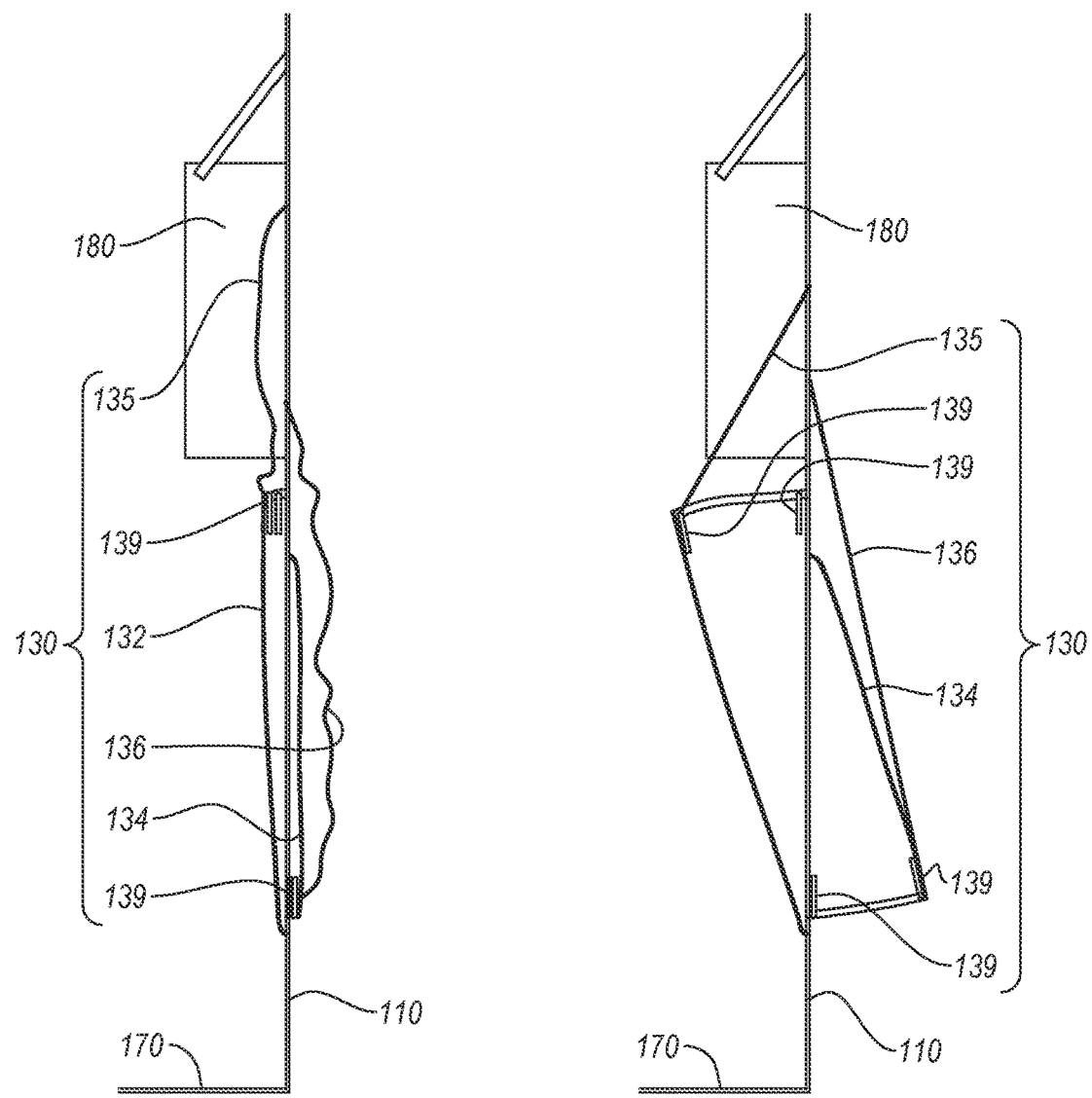
FIGS. 5 and 6 are cross-sectional views of the at least one directional vent on the one or more walls in a closed and open configuration respectively, according to embodiments.

FIGS. 5 and 6 are cross-sectional views of the at least one directional vent 130 on the one or more walls 110 in a closed and open configuration respectively, according to embodiments. The at least one directional vent 130 includes the inlet 132 and the outlet 134. The inlet 132 and the outlet 134 may be fluidly connected to form an opening in the directional vent 130 fluidly connecting the interior region of the blind 100 to the environment outside of the blind. The inlet 132 and the outlet 134 may include an adjustable channel system to vary the size of the channel connecting the inlet 132 and the outlet 134. The channel system may be an opening system that is openable and closable to a selected size. For example, the at least one directional vent 130 may include an inlet control strap 135 and an outlet control strap 136.

The inlet 132 may be positioned within the blind 100 on an inner surface of a wall 110. The inlet 132 may be sized and shaped to open with an opening thereof facing upwards. The height and width of the inlet 132 may be defined by a panel (or panels) of material connected to the wall 110. For example, a main panel (or panels) of material forming the inlet 132 may be hingedly connected to the at least one wall to define a bottom of the inlet 132. The width of the inlet 132 or main panel thereof may be at least 10 cm, such as 10 cm to 100 cm, 10 cm to 50 cm, 30 cm to 70 cm, 60 cm to 100 cm, more than 20 cm, or less than 100 cm. The height of the main panel (as measured from the bottom of the main panel to the top) or inlet 132 at least partially defined thereby may be at least 10 cm, such as 10 cm to 50 cm, 10 cm to 25 cm, 25 cm to 50 cm, more than 20 cm, or less than 50 cm. The main panel may swing inwardly from the bottom thereof open. In some examples, the main panel may be at least partially rigid or may include rigid materials therein. The lateral ends of the inlet 132 may be bounded by pieces of material to prevent gasses from going out of the sides of the inlet 132. Accordingly, the inlet 132 may be sized and shaped as the top of a chute that opens inwardly in the interior region of the blind 100. The top of the main panel may hinge away from the wall 110 by a distance of at least 1 cm, such as 1 cm to 30 cm, 1 cm to 10 cm, 10 cm to 20 cm, more than 5 cm, or less than 50 cm.

As shown in FIG. 5, the inlet 132 may be closed by utilizing attachments 139 to retain the top of the main panel of material forming the inlet 132 to the inner surface of the wall 110 that the at least one directional vent 130 is located on. The top of the inlet 132 and the wall 110 may include corresponding attachments 139 to retain the top of the main panel of the inlet 132 against the wall 110 in the closed configuration. Any number of attachments 139 may be utilized, such as only at the corners of the main panel of the inlet 132 or at a plurality of points across the top of the main panel. The attachments 139 may include magnets, buttons, zippers, hook and loop fasteners, a reusable adhesive, or the like. The attachments 139 may be attached or separated from each other to open or close the inlet 132.

The inlet 132 may include control straps 135 anchored to the wall 110 above the inlet and attached to the top of the main panel of the inlet 132 to prevent the inlet 132 from opening too wide. Any number of control straps 135 may be utilized on an inlet 132, such as one at each of the top corners of the main panel of the inlet 132 or any number across the top of the inlet 132. The control straps 135 may include a fabric, a cord, straps, or the like. The control straps 135 may include any of the materials disclosed herein for the cover, such as polyethylene straps or strings.

While not shown, control straps 135 may additionally or alternatively be attached to the inner surface of the wall 110 below the inlet 132 and attached to the top of the main panel of the inlet 132 to force the inlet 132 to open when the control straps 135 are tightened.

As shown in FIG. 6, when the top of the main panel of the inlet 132 is moved away from the wall 110, gravity may aid in retaining the position of the top of the main panel of the inlet 132 away from the wall 110. The control straps 135 may be tightened or loosened to control the size of the opening of the inlet 132, such as allowing the top of the main panel of the inlet 132 to move away from the wall 110 or by pulling the top of the main panel of the inlet 132 toward the wall 110.

The inlet 132 at least partially overlaps the outlet 134 such that when both opened, gasses can flow through the inlet 132 and exit the blind through the outlet 134. The inlet 132 is fluidly connected to the outlet 134. For example, the inlet 132 and outlet 134 may be fluidly connected by a gap, net, or mesh material in the at least one wall 110 where the inlet 132 and the outlet 134 overlap. The net or mesh material may also physically separate components of the inlet 132 and outlet 134.

The outlet 134 may be positioned outside of the blind 100 on an outer surface of a wall 110. The inlet 132 may be sized and shaped to open with an opening thereof facing downward. Preferably, the outlet 134 is positioned near the lower or lowest extent of the at least one wall 110 so that any gasses exiting the outlet 134 are first directed onto the ground. Such a configuration provides that any remaining human scent in the gasses is directed onto the ground to reduce the transmission of the same in the environment. Accordingly, animals near the blind 100 may not be able to detect the presence of the occupant of the blind 100 from any residual human scent in the air expelled from the blind through the vent.

The height and width of the outlet 134 may be defined by a panel (or panels) of material connected to the wall 110. For example, a main panel (or panels) of material forming the outlet 134 may be hingedly connected to the at least one wall 110 to define a top of the outlet 134. In some examples, the main panel may be at least partially rigid or may include rigid materials therein. The width of the outlet 134 or main panel thereof may be at least 10 cm, such as 10 cm to 100 cm, 10 cm to 50 cm, 30 cm to 70 cm, 60 cm to 100 cm, more than 20 cm, or less than 100 cm. The height of the main panel (as measured from the bottom of the main panel to the top) or outlet 134 at least partially defined thereby may be at least 10 cm, such as 10 cm to 50 cm, 10 cm to 25 cm, 25 cm to 50 cm, more than 20 cm, or less than 50 cm. The main panel of the outlet 134 may swing outwardly from the top thereof to open. The lateral ends of the outlet 134 may be bounded by pieces of material connected to the one or more walls 110 (e.g., hinged endcaps) to prevent gasses from going out of the sides of the outlet 134. Accordingly, the outlet 134 may be sized and shaped as the bottom of a chute that opens outwardly in the exterior environment of the blind 100. The bottom of the main panel may hinge away from the wall 110 by a distance of at least 1 cm, such as 1 cm to 30 cm, 1 cm to 10 cm, 10 cm to 20 cm, more than 5 cm, or less than 50 cm.

As shown in FIG. 5, the outlet 134 may be closed by utilizing attachments 139 to retain the bottom of the main panel of material forming the outlet 134 to the outer surface of the wall 110 that the at least one directional vent 130 is located on. For example, the bottom of the outlet 134 and the wall 110 may include corresponding attachments 139 to retain the bottom of the main panel of the outlet 134 against the wall 110 in the closed configuration. Any number of attachments 139 may be utilized, such as only at the bottom corners of the main panel of the outlet 134 or at a plurality of points across the bottom of the main panel. The attachments 139 may be attached or separated from each other to open or close the outlet 134.

The outlet 134 may include control straps 136 anchored to the wall 110 above the outlet 134 and attached to the bottom of the main panel of the outlet 134 to open the outlet 134 and to prevent the outlet 134 from opening too wide. The control straps 136 may be similar or identical to the control straps 135, in one or more aspects. Any number of control straps 136 may be utilized on the outlet 134, such as one at each of the bottom corners of the main panel of the outlet 134 or any number across the bottom of the outlet 134.

As shown in FIG. 6, when the bottom of the main panel of the outlet 134 is moved away from the wall 110, by the control straps 136, the size of the opening of the outlet 134 may be selected. For example, tightening the control straps 136 may pull the bottom of the main panel of the outlet upward and outward to move away from the wall 110. The control straps 136 may be loosened to at least partially close the outlet 134.

While the control straps 135 and 136 are illustrated throughout the figures, the blind 100 may include other configurations of controlling the size of openings the inlet 132 and outlet 134, such as such as push tabs or bars, tension hinges, pivoting window hinges, or the like. Such structures may be positioned to effectuate controlling the size of the openings of the inlet 132 and outlet 134, such as at the corners of the open end of the inlet and outlet or the connection of the inlet 132 and outlet 134 to the wall 110.

The control straps and attachments disclosed herein form a channel adjustment system to change the size of the channel between the inlet and the outlet.

As noted above, the at least one oxidant generator mount 165 may include a mount located above and adjacent to the inlet 132 of some of the at least one directional vents 130 on the inner surface, which is effective to allow oxidant output from the at least one portable oxidant generator 180 thereon to flow directly into the inlet 132 and out of the outlet 134. For example and shown in FIG. 6, when the inlet 132 and outlet 134 of the directional vent 130 are open and a portable oxidant generator 180 is positioned on the oxidant generator mount above the directional vent 130, the air from the interior region of the blind may be pulled through the input of the portable oxidant generator 180, treated by the oxidant generated therein, and output into the external environment outside of the blind 100. Such direct treatment of air from the interior region of a blind limits the risk of alerting animals to the presence of the human inside of the blind through scent without flooding the inside of the blind with the oxidant.

Returning to FIGS. 1-4, the at least one directional vent 130 may include a plurality of directional vents 130 each located in a lower region of the one or more walls 110 with the outlet facing downward. For example, each of the one or more walls 110 may include a directional vent 130 thereon. In such examples, one or more of the walls 110 may include a window 112 or 114 thereon. In some examples, only a limited number of walls 110 may include a directional vent 130. For example, a blind may include two walls 110 with windows and two walls 110 without windows (e.g., 180° blind). In such examples, at least the two walls 110 without windows may include a directional vent 130 thereon. Accordingly, air from inside of the blind may be output into the environment in the opposite direction the hunter is facing. Such a configuration is particularly useful when the windows are facing an oncoming wind.

In some examples, three of the walls 110 may include windows and one wall 110 may not (e.g., 270° blind). In such examples, any number of the walls may include a directional vent 130 thereon. In some examples, one wall 110 may include windows and three walls 110 may not (e.g., 90° blind). In such examples, any number of the walls may include a directional vent 130 thereon.

In some examples, the at least one directional vent 130 does not include the inlet 132. In such examples, the at least one oxidant generator mount 165 may be positioned to locate the output of the at least one oxidant generator mounted thereto over the outlet 134.

By making the directional vents 130 selectively openable, the occupant of the blind 100 may choose the direction and time to output oxidant and air from the interior region of the blind 100 into the environment.

Similarly, the one or more roof vents 140 may be selectively openable. For example, the one or more roof vents 140 are openable and closable to a selected size. As shown in FIGS. 1-3, the one or more roof vents 140 may be located in a peripheral region of the roof 120, such at or near where the roof 120 connects to the one or more walls 110. The one or more roof vents 140 are directed outward from the roof 120 and the one or more walls 110. For example, the one or more roof vents 140 open to allow air to be output at a non-parallel angle with respect to the roof 120 at the roof vent 140. Accordingly, when a portable oxidant generator 180 is positioned in the one or more roof vents 140, the oxidant is not output onto the blind 100.

Figure 7:
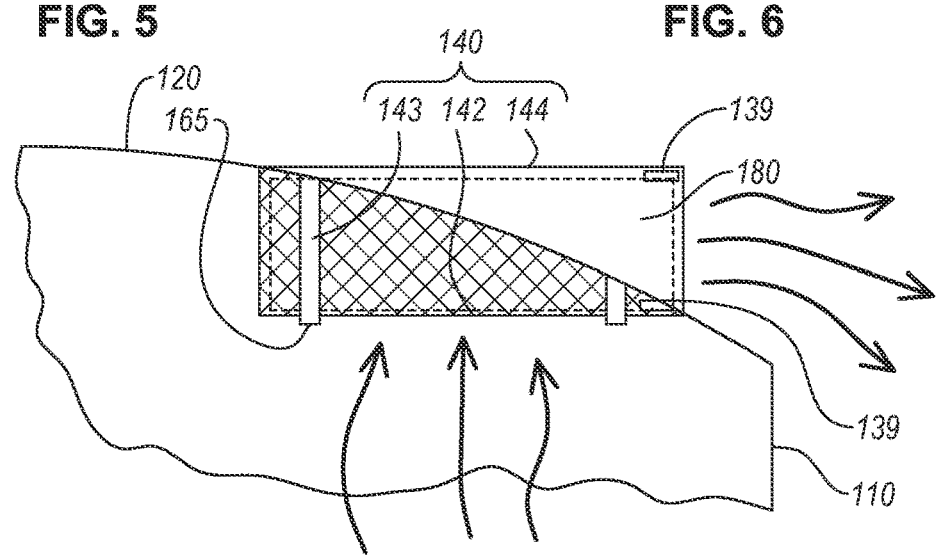
FIG. 7 is a cross-sectional view a roof vent on the roof in an open configuration, according to embodiments.

FIG. 7 is a cross-sectional view a roof vent 140 on the roof 120 in an open configuration, according to embodiments. The one or more roof vents 140 may be similar or identical to the one or more directional vents 130 in one or more aspects. For example, the one or more roof vents include an in inlet 142 in the inner surface of the roof 120 and an outlet 144 on the outer surface of the roof 120. The inlet 142 and the outlet 144 at least partially overlap on the roof 120 to define at least a portion of the roof vent 140. The inlet 142 and the outlet 144 are fluidly connected, such as through a gap, net, or mesh therebetween. Accordingly, gasses from inside the blind may flow into the inlet 142 and out of the outlet 144 into the exterior environment outside of the blind.

The inlet 142 may include a main panel which opens into the interior region of the blind from the roof. The main panel of the inlet 142 may be hingedly connected to the inner surface of the roof 120. The inlet 142 may differ from the inlet 132 in certain aspects. For example, the main panel of the inlet 142 may be sized and shaped to accommodate at least a portion of the portable oxidant generator 180 therein. The length and width of the inlet 142 or main panel thereof may be at least 10 cm respectively, such as 10 cm to 50 cm, 10 cm to 25 cm, 25 cm to 50 cm, more than 20 cm, or less than 50 cm. The main panel of the inlet 142 may be formed of any of the materials disclosed herein for the cover, such as oxidant resistant and waterproof materials. The main panel of the inlet 142 may be a mesh or net material to allow flow of air into an air intake of the portable oxidant generator 180 disposed therein, such as on the bottom of the portable oxidant generator 180. The main panel may hinge downward from the roof 120 to form an opening of a selected sized, such as by a distance of at least 1 cm, such as 1 cm to 30 cm, 1 cm to 10 cm, 10 cm to 20 cm, more than 5 cm, or less than 50 cm.

In some examples, the one or more roof vents 140 are connected to the at least one oxidant generator mount 165 located on the roof 120 effective to allow oxidant output from at least one oxidant portable generator 180 disposed therein to output directly through the one or more roof vents 140. In such examples, the inlet 142 may include one or more support straps 143 for supporting the weight of a portable oxidant generator 180 therein. The one or more support straps 143 may form at least a portion of an at least one oxidant generator mount 165. The main panel of the inlet 142 and the one or more straps 143 may be sized and positioned to angle an output of the portable oxidant generator 180 at a non-parallel angle with respect to roof of the blind at the outlet 144.

In some examples, the main panel of the inlet 142 or the inlet 142 itself may be omitted and the one or more support straps 143 may be used to place the portable oxidant generator 180 in communication with the outlet 144. In such examples, the roof vent 140 may include only the outlet 144 and the one or more support straps 143 (e.g., at least one oxidant generator mount 165).

The outlet 144 is attached to the cover of the roof 120. The outlet 144 includes a main panel that is formed any of the materials disclosed herein for the cover. The main panel of the outlet 144 may include a water proof material. Accordingly, when the outlets 144 are open, water leaking in from the roof vent 140 may be limited or prevented. The length and width of the outlet 144 or main panel thereof may be at least 10 cm respectively, such as 10 cm to 50 cm, 10 cm to 25 cm, 25 cm to 50 cm, more than 20 cm, or less than 50 cm. The main panel may be connected to the roof 120 at the top of the main panel at a portion of the roof inward from the periphery thereof. The main panel of the outlet 144 may be hingedly connected to the roof 120. The main panel may hinge upward from the roof 120 to form an opening of a selected sized, such as by a distance of at least 1 cm, such as 1 cm to 30 cm, 1 cm to 10 cm, 10 cm to 20 cm, more than 5 cm, or less than 50 cm. The main panel may be connected to the roof 120 at the sides of the main panel to form the outlet 144 or may be connected to side panels that connect to the roof 120. Accordingly, air cannot move around the sides of the main panel of the outlet 144 because the outlet 144 is connected to the roof 120 at the sides of the outlet 144. Such a configuration provides that gasses emitted through the outlet 144 are directed at least partially away from the roof 120 and one or more walls 110 of the blind 100 only after treatment in a portable oxidant generator to remove human scent. Accordingly, animals near the blind 100 may not be able to detect the presence of the occupant of the blind 100 from the gasses emitted from the blind 100.

The outlet 144 may overlap the size of the inlet 142 or portable oxidant generator 180 therein to ensure that rain or snow does not leak into the interior region of the blind 100 when the outlet 144 is open. The outlet may be at least 2 cm larger than the inlet or the lateral measurements of the portable oxidant generator 180, such as 2 cm to 10 cm larger.

The outlet 144 may be held open by a portable oxidant generator 180 disposed in the roof vent 140 (e.g., in the straps 143 and or inlet 142). The outlet 144 may be held open or sized by push tabs or bars, tension hinges, pivoting window hinges, or the like attached to the roof 120 and main panel of the outlet 144. As shown in FIG. 7, when the portable oxidant generator 180 is disposed in the roof vent 140, the outlet 144 is maintained in an open position.

As shown in FIG. 7, the outlet 144 may be closed by utilizing attachments 139 to retain the outermost portion of the main panel of material forming the outlet 144 to the outer surface of roof 120 when the roof vent 140 is closed. For example, the outmost portion of the outlet 144 (respective to the center of the roof 120) and the roof 120 may include corresponding attachments 139 to retain the outermost portion of the main panel of the outlet 144 against the roof 120 in the closed configuration. Any number or types of attachments 139 may be utilized. The attachments 139 may be attached or separated from each other to open or close the outlet 144 and roof vent 140.

The blind 100 may include one or more roof vents 140 located on the periphery of the roof 120 adjacent to the one or more walls 110 or at an outmost extent of the roof. In some examples, the blind 100 includes roof vents adjacent to all of the one or more walls 110. Accordingly, portable oxidant generators 180 may be used to selectively control where air from the interior region of the blind that has been treated with oxidants is output. In some examples, the blind 100 includes roof vents only adjacent to walls 110 of the blind that do not include windows. In some examples, the blind 100 includes roof vents only adjacent to walls 110 that include windows.

Portable oxidant generators 180 may be employed to hide, destroy, or cover human scent while hunting. Oxidants such as ozone, hydroxyl radicals, or the like may react with human scent molecules (e.g., molecules found my animals to be synonymous with humans or foreign to their environment) to alter the human scent molecules to a form that is not associated with humans. Human scent molecules are controlled or eliminated by the systems and methods herein by reacting the human scent molecules with oxidants such as ozone or other scent control material(s) such as reducers to change the molecular structure of the scent molecules to reduce or eliminate human scents or odors.

Suitable portable oxidant generators 180 may include portable ozone generators such as corona discharge ozone generators, ultraviolet ozone generators, or any other type of ozone generator. Corona discharge ozone generators present the advantages of being relatively small and efficient in comparison to other oxidant generators. Suitable corona discharge ozone generators may include those found the HR200, HR230, HR300, or other ozone generators from Ozonics LLC, of Mason City, Iowa, U.S.A. In some examples, the portable oxidant generator 180 may be similar or identical to the portable oxidant generator(s) or scent control devices disclosed in U.S. patent application Ser. No. 16/507,464, filed on 10 Jul. 2019, which is incorporated herein by this reference in its entirety.

The portable oxidant generator 180 may include a source of peroxides or derivatives thereof (e.g., hydroperoxides, hydroxyl radicals, or peroxide radicals). For example, a catalytic ionizer may provide oxidants. While portable oxidant generators are discussed, it should be understood that some portable oxidant generators may also produce reducers, such as certain ions. For example, corona discharge ozone generators also produce ions such as hydroxide ions or the like, which are reducers. Such reducers may similarly react with human scent molecules to eliminate or change the scent thereof.

Figure 8:
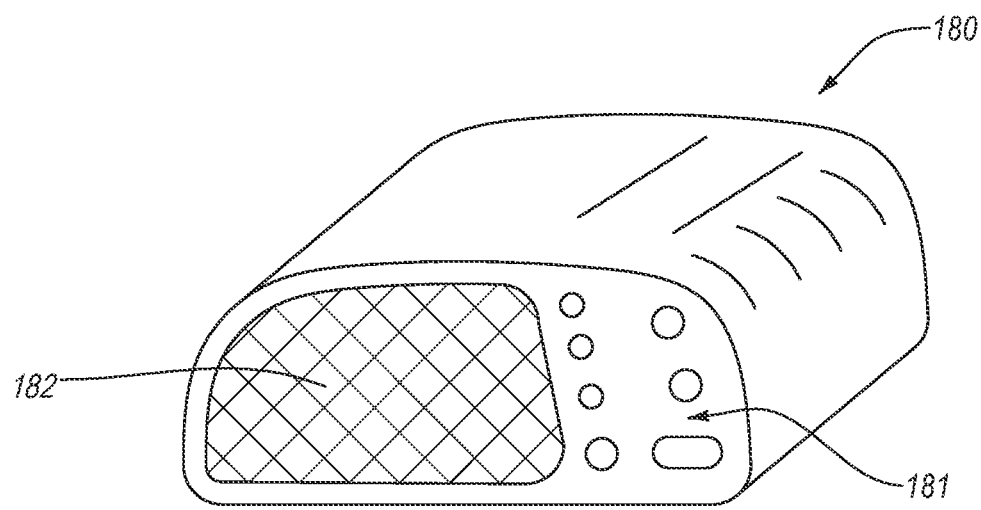
FIG. 8 is an isometric view of a portable oxidant generator, according to an embodiment.
Figure 9:
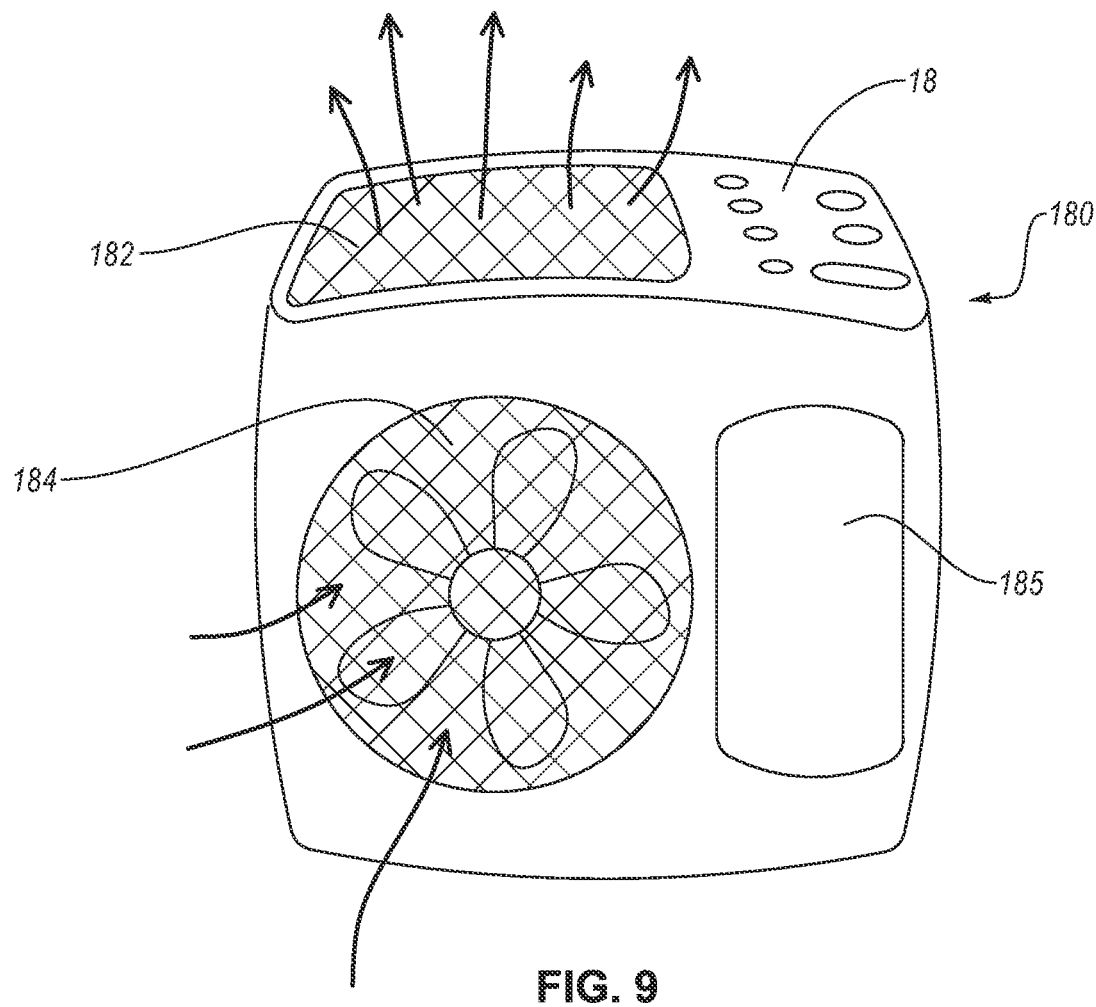
FIG. 9 is bottom view of the portable oxidant generator of FIG. 8.

FIG. 8 is an isometric view of a portable oxidant generator 180, according to an embodiment. FIG. 9 is bottom view of the portable oxidant generator 180 of FIG. 8. As shown, the portable oxidant generator 180 may be a corona discharge generator with an output 182 on a front face thereof and an intake 184 at a bottom surface thereof. The output 182 and intake 184 may include a grill or grating sized and shaped to prevent at least some objects (e.g., fingers or debris) from penetrating into the portable oxidant generator 180. The grill of the output 182 or 184 may cover a fan, corona discharge electrodes, or the like thereunder in the interior of the portable oxidant generator 180. The portable oxidant generator 180 includes a controller 181 for controlling one or more of the generation or output of oxidant therefrom. The controller 181 may control activation of the portable oxidant generator 180, an oxidant output rate, fan speed of one or both of the intake and the output, or other characteristics of the device. The portable oxidant generator 180 includes a power source 185 such as a replaceable or rechargeable battery pack.

The intake 184 may include an intake fan that pulls air into the portable oxidant generator 180, such as to pass the air over corona discharge electrodes to produce ozone and treat the air to remove human scents therefrom. The treated air may pass through the output 182 to the when expelled from the portable oxidant generator 180. A portable oxidant generator 180 with an intake 184 on the bottom and an output 182 on the front (or even the back) of the device may be particularly useful for the blind 100. For example, the intake 184 may be useful when the portable oxidant generator 180 is positioned in a roof vent with a mesh or net inlet to allow air to be pulled upward through the intake 184, treated with oxidant produced in the portable oxidant generator 180, and vented through the output 182 to the external environment outside of the blind 100.

The at least one portable oxidant generator 180 may include a mount or attachment (not shown) for at least temporarily affixing to the at least one oxidant generator mount, such as one or more straps, cords, hooks, d-rings, adapters, or the like. The mount or attachment may be complementary to the at least one oxidant generator mount, such as a d-ring for attaching a hook, cord, or strap to.

The portable oxidant generator 180 may additionally or alternatively include a portable ion generator. Portable ion generators may produce reducers which may destroy or alter human scent molecules and sources in a way analogous to oxidants. Portable ion generators may produce hydroxide ions, nitrite ions, superoxide ions, hydrogen ions, or the like to reduce or otherwise react with scent molecules to make unrecognizable derivatives of the human scent molecules. Accordingly, reference to oxidants, oxidation, scent control via oxidation or the like may be substituted or complemented with reducers, reduction, and scent control via reduction in the examples disclosed herein. The portable ion generator or reducer source may include a corona discharge generator or other electrical discharge electrode system, or a fluid reducer storage combined with a mist sprayer operably to spray a mist (e.g., droplets or micro droplets) of fluid reducer.

Referring back to FIGS. 1-4, one or more portable oxidant generators 180 may be positioned in the blind 100 on the one or more oxidant generator mounts 165 to treat air from the interior region of the blind 100, such as in order to hide, destroy, eliminate, or cover the scent of the hunter to animals in the area of the blind 100. As shown, a portable oxidant generator 180 may be disposed on the one or more walls 110 above one or more of the directional vents 130, on the roof 120 such as in the one or more roof vents 140 or from the one or more oxidant generator mounts 165 hanging from the roof 120. Accordingly, the blinds 100 and one or more portable oxidant generators 180 may be utilized to create a blind system for hiding, destroying, altering, eliminating, or covering human scent in and from the blind 100. Such systems may include any of the blinds 100 (or embodiments thereof) disclosed herein in combination with any of the one or more portable oxidant generators 180 disclosed herein. For example, at least one portable oxidant generator 180 may be disposed in one or more of the at least one wall 110 or the roof 120 of the blind 100, such as in the at least one oxidant generator mount 165 thereon to form a blind system. In some examples, the blind systems may include a portable oxidant generator within the blind but not in an oxidant generator mount. Blind systems are depicted in FIGS. 1-7, 10, and 11 herein.

The configuration of the one or more portable oxidant generators 180 within the blind and the vents on the blind may be selected based on the position of the blind 100 relative to the wind direction or other environmental factors around the blind 100.

Figure 10:
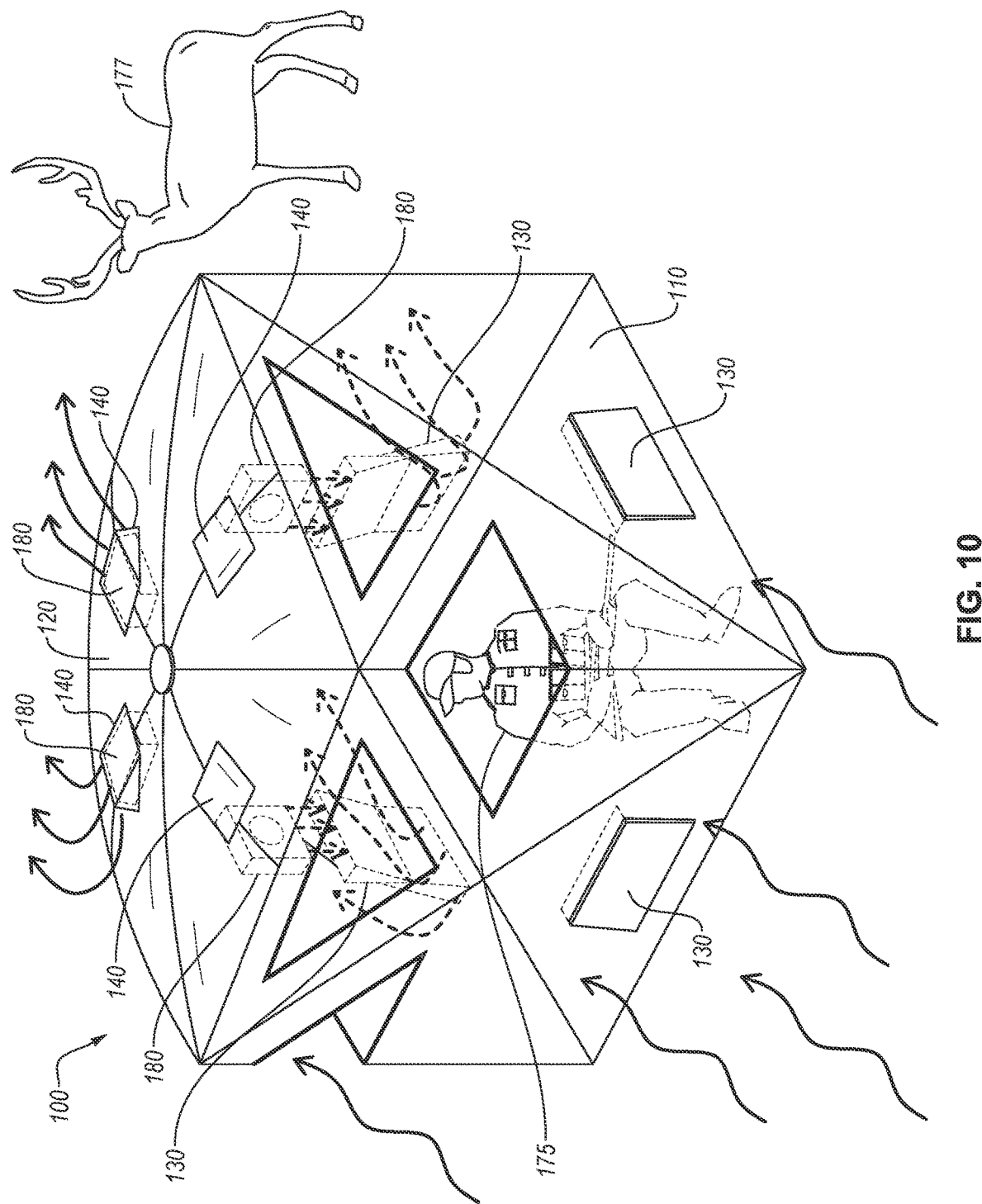
FIG. 10 is an isometric view of the blind facing into the wind, according to an embodiment.

FIG. 10 is an isometric view of the blind 100 facing into the wind, according to an embodiment. As shown, the blind 100 may include a plurality of directional vents 130. The directional vents 130 on the walls 110 facing into the wind may be closed and the directional vents 130 on the walls 110 facing away from the wind may be opened to emit scent control material (e.g., oxidant) and treated air from the interior region of the blind 100 into the ground downwind of the blind 100. The roof vents 140 on the sides of the roof 120 facing into the wind may be closed and the roof vents 140 on the sides of the roof 120 facing away from the wind may be opened to emit scent control material (e.g., oxidant) and treated air from the interior region of the blind 100 downwind of the blind 100. The closed vents limit the flow of air into the blind 100. In such examples, the windows on the sides of the blind facing the wind may remain closed until a hunter is ready to shoot.

In some embodiments, the blind in FIG. 10 may be 180° blind with the walls 110 facing away from the wind not having windows thereon. In such examples, the inner surfaces of the walls 110 facing away from the wind may be black or another dark color. Any other configuration of the blind or location(s) of the portable oxidant generators may be used in the situation depicted in FIG. 10.

The air in the wind that passes over the hunter, over the blind, and out of the blind may be treated with oxidants by the portable oxidant generators 180 to hide, destroy, alter, or otherwise eliminate human scent from the hunter 175 conceal the presence of the hunter in the blind 100 from animals 177 downwind of the blind 100.

Figure 11:
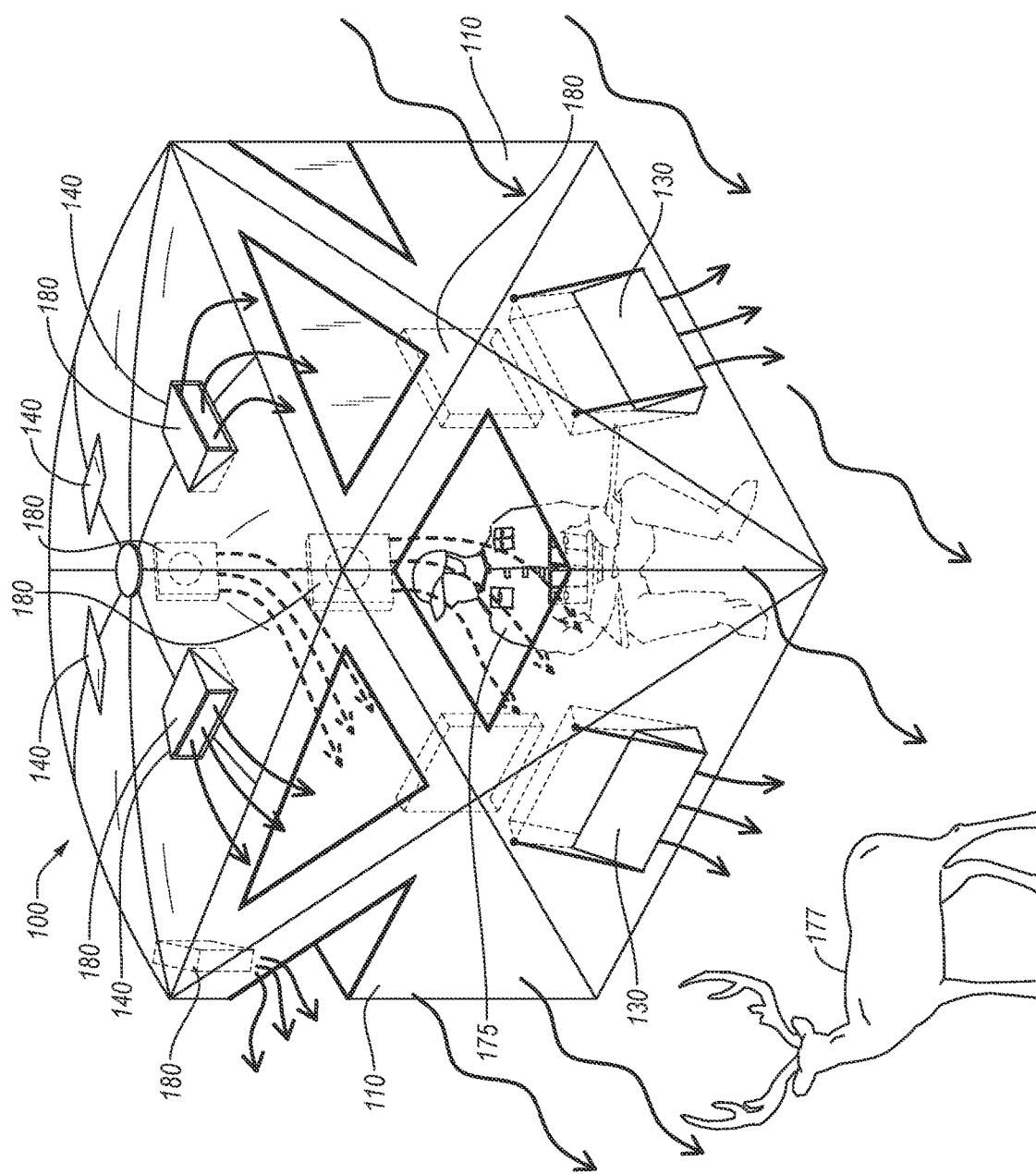
FIG. 11 is an isometric view of the blind facing away from the wind, according to an embodiment.

FIG. 11 is an isometric view of the blind 100 facing away from the wind, according to an embodiment. As shown, the blind 100 may include a plurality of directional vents 130. The directional vents 130 on the walls 110 facing away from the wind may be opened to emit scent control material (e.g., oxidant) and treated air from the interior region of the blind 100 into the ground downwind of the blind 100 and directional vents 130 on the walls 110 facing into the wind (not shown) may be closed. The roof vents 140 on the sides of the roof 120 facing into the wind may be closed and the roof vents 140 on the sides of the roof 120 facing away from the wind may be opened to emit scent control material (e.g., oxidant) and treated air from the interior region of the blind 100 downwind of the blind 100. The closed vents limit the flow of air into the blind 100. In such examples, the windows on the walls 110 of the blind 100 facing the wind may remain closed until a hunter is ready to shoot.

In some embodiments, the blind in FIG. 11 may be 180° blind with the walls 110 facing into the wind not having windows thereon. In such examples, the inner surfaces of the walls 110 facing into the wind may be black or another dark color. Any other configuration of the blind or location(s) of the portable oxidant generators may be used in the situation depicted in FIG. 11.

The air in the wind that passes over the hunter 175, over the blind 100, and out of the blind 100 may be treated with oxidants by the portable oxidant generators 180 to hide, destroy, alter, or otherwise eliminate human scent from the hunter 175 conceal the presence of the hunter 175 in the blind 100 from animals 177 downwind of or near the blind 100.

Though various vents (directional vents and roof vents) are depicted as open or closed and portable oxidant generators 180 are show in various positions in the blind 100 with respect to wind directions in FIGS. 10 and 11, any vents may be open or closed and one or more portable oxidant generators 180 may be located in any positions in the blind 100. Any of the blinds 100 or variations thereof may be used for hunting in any conditions including those depicted in FIGS. 10 and 11.

Figure 12:
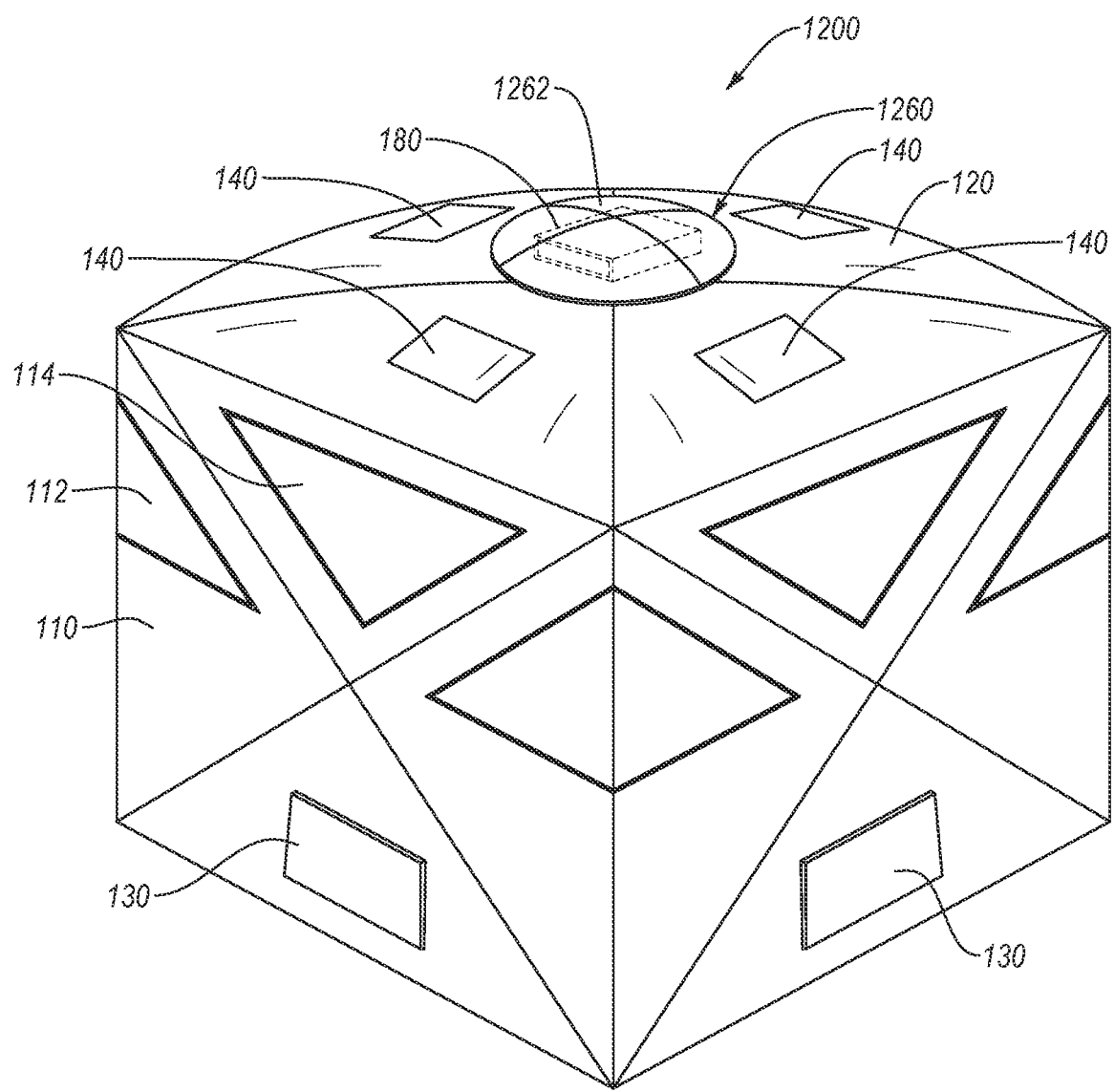
FIG. 12 is an isometric view of a blind including a rotatable port, according to an embodiment.
Figure 13:
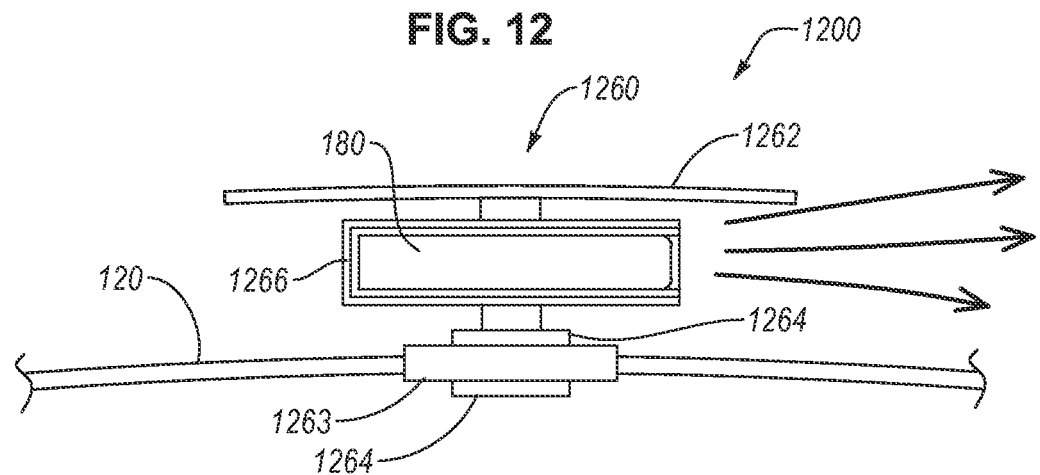
FIG. 13 is a cross-sectional view of the rotatable port of FIG. 12.

The blinds disclosed herein may include a rotatable port for holding a portable oxidant generator therein. FIG. 12 is an isometric view of a blind 1200 including a rotatable port 1260, according to an embodiment. FIG. 13 is a cross-sectional view of the rotatable port 1260 of FIG. 12. The blind 1200 includes the one or more walls 110, the roof 1220, the at least one directional vent 130, the one or more roof vents 140, and the one or more windows 112 and 114, as disclosed herein. The blind 1200 further includes the rotatable port 1260 for holding and rotating a portable oxidant generator 180 therein. The rotatable port 1260 may be located at or near the apex of the roof 1220. For example, the rotatable port 1260 may be located in, attached to, or form a portion of a central hub 1263 of the roof 1220. The roof 1220 is similar or identical to the roof 120 in one or more aspects and includes the rotatable port 1260 in the central hub 1263. In such examples, the central hub 1263 may include a rigid body which is attached to poles supporting the roof 1220. The central hub 1263 may include plastic and/or metal construction. The central hub 1263 may include a rotating assembly 1264 therein. The rotating assembly 1264 may be attached to the central hub 1263 via a rotatable connection such as one or more bearings, a slip fit of pieces sandwiching the central hub 1263, or the like. Accordingly, the rotating assembly 1264 is rotatable with respect to the central hub 1263.

As shown, the rotating assembly 1264 may include a first portion disposed below the central hub 1263 in the interior region of the blind 1200 and a second portion disposed on top of the central hub 1264 on the outside of the blind. The first portion of the rotating assembly 1264 may be manipulated by an occupant of the blind 1200 to rotate a portable oxidant generator attached to the second portion of the rotating assembly 1264.

The rotating assembly 1264 may include a port 1266 (e.g., mount, pocket, or the like) for holding the portable oxidant generator 180 therein or thereon. The port 1266 may be sized and shaped to hold the portable oxidant generator 180 therein or thereon. The port 1266 may be constructed of metal or polymer, such as polymers that are resistant to oxidation. The port 1266 may have one or more grates or vents therein to allow air to flow therethrough. The port 1266 may be attached to the second portion of the rotating assembly 1264 via a riser or directly. The rotating assembly 1264 may include one or more risers for separating the oxidant output generator from the surface of the roof 1220 or central hub 1263 by a selected distance. In some examples, there may not be risers. The rotating assembly 1264 may include lock, brake, or other retention component for maintaining the rotational position of the rotating assembly 1264 with respect to the central hub 1263, such as to align an output of the portable oxidant generator with a downwind direction of the wind.

The portable oxidant generator 180 may be disposed in the port 1266 and operated via a remote control or manually. The portable oxidant generator 180 may be protected from weather by a cap 1262 thereover. The cap 1262 may be formed of the same fabric as the cover for the one or more walls 110 and roof 1220. The cap 1262 may be sized to overlap the dimensions of the portable oxidant generator 180 to prevent rain or snow from falling directly on the portable oxidant generator 180. In some examples, the cap 1262 may be formed of a rigid material such as a metal or a polymer.

In some examples, the rotatable port 1260 may be configured different than depicted. For example, the cap 1262 may be attached to the roof 1220 by risers extending from the roof 1220 and the rotating assembly 1264 may rotate freely with respect to the cap 1262. The rotatable port 1260 allows occupants of the blind 1200 to orient the output of the portable oxidant generator 180 in a selected direction without leaving the interior of the blind.

In some examples, the blinds disclosed herein may include a wind monitoring system to detect one or more of wind direction or wind speed. Such a device may include a wind vane or flag. In some examples, the wind monitoring device may include an electronic wind detector which provides a visual indication of the wind direction such as the Firefly Electronic wind Detector from Intrinsic Minds, LLC. In such examples, the electronic wind detector may be mounted on the roof of the blind and provide a visual indication of wind direction inside of the blind such as via light emitting diodes indicating the wind direction. For example, the direction of the oncoming wind may be projected onto the interior of a wall of the blind corresponding to that direction. Such indications may be given in the oncoming direction or the opposite direction In such examples, occupants of the blind may be able to accurately determine wind direction, open one or more vents of the blind, position portable oxidant generators 180, and operate the portable oxidant generators 180 to control human scent without leaving interior of the blind.

While soft-sided blinds (e.g., blinds that have flexible construction such as fabric) are described in detail herein, blinds including the directional vents and roof vents may include hard-sided blinds. Such hard-sided blinds may be similar or identical to the soft-sided blinds disclosed herein in one or more aspects, but may have a rigid construction that includes one or more of wood, fiberglass, polymer panels, or the like. For example, the hard-sided blinds may include at least one directional vent, one or more roof vents, or a rotatable port, as disclosed herein. In such examples, one or more portions of the directional vents or roof vents may be fabric as disclosed herein or may include rigid construction that includes one or more of wood, fiberglass, polymer panels, or the like. For example, the main panel of the inlet, the outlet, or any other portions of the directional vent may be constructed of a rigid material such as fiberglass.

In some examples, the directional vents of a hard-sided blind may include both fabric and rigid materials, such as having rigid main panels and fabric endcaps connected to the main panels on the sides thereof and to the wall of the blind to prevent air from escaping around the sides of the main panel and to allow the main panel to swing away from the wall of the blind. Likewise, the main panel or any other portions of the roof vents may be constructed of a rigid material. The control structures for opening, closing, and controlling the amount of air that can flow through the at least one directional vent or one or more roof vents may be soft (e.g., straps as disclosed with respect to blind 100) or may be rigid (e.g., tension or locking hinges).

One or more portions of hard-sided blinds may have similar or identical dimensions, components, or functionally of any portions of the soft-sided blinds disclosed herein. For example, the one or more walls may include rigid walls with a frame and cover that are rigid and connected to a roof having the same. Such hard-sided blinds are less portable than soft-sided blinds but may be moved into the field piece by piece and assembled. In some examples, portions of the one or more walls and roof of the hard-sided blind may be integrally formed, such as a roof that is one piece constructed of fiberglass. The hard-sided blind may include one or more portions that are see-through, such as tinted glass, mirrored glass, any of the see through fabrics disclosed herein, or the like. Such portions may make windows on the blind. Any components of the soft-sided blind disclosed herein may be present as a rigid component on the hard-sided blind. Accordingly, the air flow controlled blinds disclosed herein may be implemented as soft-sided blinds, hard-sided blinds, or combinations of both.

Figure 14:
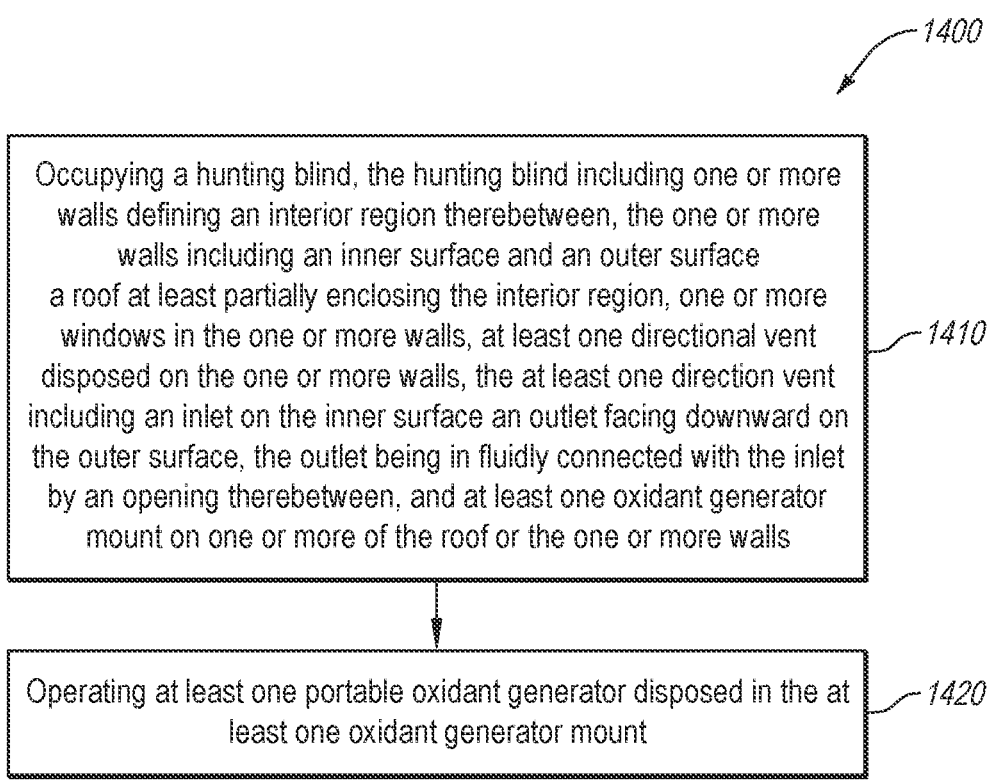
FIG. 14 is a flow chart for a method of controlling scent in and around a hunting blind, according to an embodiment.

The blinds and blind systems disclosed herein may be used for controlling human scent or other scents in and around a hunting blind. FIG. 14 is a flow chart for a method 1400 of controlling scent in and around a hunting blind, according to an embodiment. The method 1400 includes a block 1410 of occupying a hunting blind, the hunting blind including one or more walls defining an interior region therebetween, the one or more walls including an inner surface and an outer surface; a roof at least partially enclosing the interior region; one or more windows in the one or more walls; at least one directional vent disposed on the one or more walls, the at least one directional vent including an inlet on the inner surface; and an outlet facing downward on the outer surface, the outlet being in fluidly connected with the inlet by an opening therebetween; at least one oxidant generator mount on one or more of the roof or the one or more walls; and a block 1420 of operating at least one portable oxidant generator disposed in the at least one oxidant generator mount. The method 1400 may include more or fewer blocks. Any of the blocks 1410-1420 may be split or combined. For example, the block 1410 may be split into multiple blocks such as deploying the blind and entering the blind. In some examples, the block 1410 of occupying the hunting blind may be omitted from the method 1400. In some examples, the block 1420 of occupying the hunting blind may be omitted from the method 1400. In some examples, operating the operating at least one portable oxidant generator disposed in the at least one oxidant generator mount may be omitted. Additional blocks for the method 1400 are also discussed below.

The block 1410 of occupying a hunting blind may include occupying any of the hunting blinds disclosed herein. The hunting blind may include the hunting blinds 100 (FIGS. 1-7, 10, and 11) or 1200 (FIG. 12) with any combination of the components thereof disclosed herein. For example, the hunting blind may include one or more walls defining an interior region therebetween, the one or more walls including an inner surface and an outer surface; a roof at least partially enclosing the interior region; one or more windows in the one or more walls; at least one directional vent disposed on the one or more walls, the at least one directional vent including an inlet on the inner surface; and an outlet facing downward on the outer surface, the outlet being in fluidly connected with the inlet by an opening therebetween; at least one oxidant generator mount on one or more of the roof or the one or more walls. The at least one directional vent may include a plurality of directional vents each located in a lower region of the one or more walls with the outlet facing downward, where the outlet and the inlet of the at least one directional vent includes an opening system that is openable and closable to a selected size, and the at least one oxidant generator mount is located above and adjacent to the inlet of some of the at least one directional vent on the inner surface effective to allow oxidant output to flow directly into the inlet.

The hunting blind may include one or more roof vents directed outward from the roof and the one or more walls as disclosed herein. The one or more roof vents are connected to, incorporate, or adjacent to, the at least one oxidant generator mount located on the roof effective to allow oxidant and air from the interior region output from the at least one oxidant generator therein to output directly through the one or more roof vents. The hunting blind may include a rotatable port as disclosed herein.

Occupying the hunting blind may include entering the hunting blind. The hunting blind may include a door in the one or more walls and occupying the hunting blind may include opening the door and entering the hunting blind. Occupying the hunting blind may include closing the door. Opening and closing the door may include opening or closing a resealable member or attachment on the door such as a zipper, hook and loop fasteners, magnets, or the like.

The block 1420 of operating at least one portable oxidant generator disposed in the at least one oxidant generator mount may include turning on the at least one portable oxidant generator. The at least one oxidant generator may include any of the oxidant generators disclosed herein, such as a corona discharge ozone generator or an ion generator. In some examples, the at least one portable oxidant generator includes a plurality of portable oxidant generators and operating at least one portable oxidant generator disposed in the at least one oxidant generator mount includes turning on two or more of the plurality of portable oxidant generators. For example, operating at least one portable oxidant generator disposed in the at least one oxidant generator mount may include turning on a at least one (e.g., a first) portable oxidant generator (e.g., a first) disposed on the one or more walls (e.g., above an inlet of a directional vent) and turning on at least one (e.g., a second) portable oxidant generator disposed on the roof (e.g., in a roof vent or hanging near a window).

Operating at least one portable oxidant generator disposed in the at least one oxidant generator mount may include controlling output of the at least one portable oxidant generator, such as increasing or decreasing output of the oxidant. Operating at least one portable oxidant generator disposed in the at least one oxidant generator mount may include intaking air (and human scent molecules therein) from the interior region into the at least one portable oxidant generator, treating the air with oxidant produced in the at least one portable oxidant generator, and outputting the treated air outside of the blind through the at least one directional vent. Operating at least one portable oxidant generator disposed in the at least one oxidant generator mount may include intaking air from the interior region into the at least one portable oxidant generator, treating the air with oxidant produced in the at least one portable oxidant generator, and outputting the treated air outside of the blind through the one or more roof vents.

In some examples, the portable oxidant source need not be in an oxidant generator mount, but only be within the interior region of the blind. In such examples, operating the at least one portable oxidant generator may be carried out as described above except out of the oxidant generator mount.

The method 1200 may include opening one or more of the at least one directional vents. Opening one or more of the at least one directional vents may include opening one or both of the inlet or outlet of the at least one directional vent to a selected opening size. Opening one or more of the at least one directional vents may include opening one or both of the inlet or outlet of the at least one directional vent, such as by manipulating (e.g., loosening or tightening) the control straps thereof. Opening one or more of the at least one directional vents may include removing the attachments 139 (FIGS. 5-6) on the inlet or outlet of the at least one directional vent from the attachments on the wall. The method 1400 may include closing one or more of the at least one directional vents, such as by one or more of attaching the attachments on the intake or output to the attachments on the wall or by loosening or tightening the control straps of the intake or output. Opening or closing the one or more directional vents may be done according to wind conditions. For example, opening or closing one or more of the at least one directional vents may include opening or closing one or both of the inlet or outlet of the at least one directional vent(s) on a downwind side (e.g., facing away from the oncoming wind) of the blind. Opening or closing one or more of the at least one directional vents may include opening or closing one or both of the inlet or outlet of the at least one directional vent(s) on an upwind side (e.g., facing into the oncoming wind) of the blind.

The method 1400 may include opening one or more of the one or more roof vents. Opening one or more of the roof vents may include opening one or both of the inlet or outlet of the roof vent(s) to a selected opening size. Opening one or more of the roof vents may include opening one or both of the inlet or outlet of the roof vent(s) on a downwind side of the blind. Opening one or more of the roof vents may include opening one or both of the inlet or outlet of the roof vent(s) on an upwind side of the blind. Opening one or more of the at least one directional vents may include removing the attachments 139 (FIG. 7) on the inlet or outlet of the roof vent from the attachments on the roof. The method 1400 may include closing one or more of roof vents, such as by one or more of attaching the attachments on the intake or output to the attachments on the roof. Opening or closing roof vents may be done according to wind conditions.

The method 1400 may include disposing the at least one (portable) oxidant generator in the at least one oxidant generator mount. The at least one portable oxidant generator may include a mount or attachment for at least temporarily affixing to the at least one oxidant generator mount, such as one or more straps, cords, hooks, d-rings, adapters, or the like. Disposing may include placing, positioning, affixing, attaching, mounting, securing, or otherwise positioning a portable oxidant generator in an oxidant generator mount.

For example, disposing the at least one portable oxidant generator in the at least one oxidant generator mount may include mounting the at least one portable oxidant generator into the at least one oxidant generator mount above and proximate to a directional vent on the wall of the blind. Disposing the at least one portable oxidant generator in the at least one oxidant generator mount may include mounting the at least one portable oxidant generator into the at least one oxidant generator mount in the roof of the blind, such as in a roof vent or mount having from the roof of the blind. Disposing the at least one oxidant generator in the at least one oxidant generator mount may include mounting multiple portable oxidant generators oxidant generator mounts, such as on one or more walls, one or more roof vents, or one or more mounts hanging from the roof (e.g., in the center of the roof or adjacent to the windows).

Disposing the at least one oxidant generator in the at least one oxidant generator mount may include one or more of orienting an intake of the at least one portable oxidant generator toward the interior region of the blind or orienting an output of the at least one portable oxidant generator toward an inlet of the roof vent or at least one directional vent.

The method 1400 may include setting up (e.g., assembling or deploying) the hunting blind. Setting up the hunting blind may include placing the hunting blind in the field. Setting up the hunting blind may include assembling the poles and cover of the blind. Setting up the hunting blind may include popping up the hunting blind, such as when the hunting blind is a pop-up hunting blind.

The blinds, systems, and methods herein allow directional control of the airflow exiting a hunting blind to conceal, alter, eliminate, or hide the scent of a hunter form animals in the environment of the blind while preventing the interior of the blind from being flooded with oxidants to limit exposure of the hunter thereto. While the blinds disclosed herein are referred to as hunting blinds, the blinds are not limited to such use. For example, the hunting blinds, blind systems, and methods disclosed herein may be used for birdwatching, surveillance, photography, or any other uses.

As used herein, the term "about" or "substantially" refers to an allowable variance of the term modified by "about" by ±10% or ±5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A hunting blind, comprising:
   one or more walls defining an interior region therebetween, the one or more walls including an inner surface and an outer surface;
   a roof at least partially enclosing the interior region;
   one or more windows in the one or more walls;
   at least one directional vent disposed on the one or more walls or the roof, the at least one directional vent including:
   an inlet on the inner surface; and an outlet facing downward on the outer surface, the outlet being in fluidly connected with the inlet by a channel therebetween; and
an oxidant generator mount disposed on at least one of the roof or the one or more walls, the oxidant generator mount configured to position a portable oxidant generator at an orientation that flows oxidant output directly into the inlet of the at least one directional vent, bypassing the interior region of the hunting blind.

2. The hunting blind of claim 1, wherein the at least one directional vent includes a mesh material separating the outlet from the inlet.

3. The hunting blind of claim 1, wherein the at least one directional vent includes a plurality of directional vents each located in a lower region of the one or more walls with the outlet facing downward.

4. The hunting blind of claim 1, wherein the one or more windows are located on walls opposite to the one or more walls that include the at least one directional vent thereon.

5. The hunting blind of claim 1, wherein the outlet and the inlet include a channel adjustment system to vary a size of the channel.

6. The hunting blind of claim 1, wherein the oxidant generator mount is located above and adjacent to the inlet of the at least one directional vent on the inner surface.

7. The hunting blind of claim 1, wherein the oxidant generator mount is located on the roof.

8. The hunting blind of claim 7, wherein the at least one directional vent includes one or more roof vents directed outward from the roof and the one or more walls.

9. The hunting blind of claim 8, wherein the one or more roof vents are openable and closable to a selected size.

10. The hunting blind of claim 8, wherein the one or more roof vents are connected to the oxidant generator mount located on the roof.

11. The hunting blind of claim 10, wherein:
the at least one directional vent includes a plurality of directional vents each located in a lower region of the one or more walls with the outlet facing downward;
the outlet and the inlet include an opening system that is openable and closable to a selected size; and
the oxidant generator mount includes a mount located above and adjacent to the inlet of some of the at least one directional vent on the inner surface.

12. The hunting blind of claim 7, wherein the oxidant generator mount includes a plurality of cords hanging from the roof in the interior region.

13. The hunting blind of claim 1, further comprising a skirt extending inwardly a distance into the interior region from a lowest extent of the one or more walls.

14. A blind system, comprising:
a hunting blind including:
one or more walls defining an interior region therebetween, the one or more walls including an inner surface and an outer surface;
a roof at least partially enclosing the interior region;
one or more windows in the one or more walls;
at least one directional vent disposed on the one or more walls or the roof, the at least one directional vent including:
an inlet on the inner surface; and
an outlet facing downward on the outer surface, the outlet being fluidly connected with the inlet by an opening therebetween;
at least one oxidant generator mount on one or more of the roof or the one or more walls; and at least one portable oxidant generator positionable onto the at least one oxidant generator mount with an orientation to flow oxidant output directly into the inlet of the at least one directional vent, bypassing the interior region of the hunting blind.

15. The blind system of claim 14, wherein:
the at least one oxidant generator mount includes a mount located above and adjacent to the inlet of the at least one directional vent on the inner surface; and
the at least one portable oxidant generator is mounted on the mount above the at least one directional vent.

16. The blind system of claim 14, wherein the outlet and the inlet include an opening system that is openable and closable to a selected size.

17. The blind system of claim 14, wherein:
the at least one directional vent includes a plurality of directional vents each located in a lower region of the one or more walls with the outlet facing downward; and
the at least one portable oxidant generator is mounted above the at least one directional vent.

18. The blind system of claim 14, wherein the at least one directional vent includes one or more roof vents directed outward from the roof and the one or more walls.

19. The blind system of claim 18, wherein the one or more roof vents are openable and closable to a selected size.

20. The blind system of claim 18, wherein one or more of the at least one oxidant generator mount is incorporated into the one or more roof vents.

21. The blind system of claim 18, wherein:
the at least one oxidant generator mount includes a hanging mount hanging downward from the roof; and
the at least one portable oxidant generator includes a portable oxidant generator mounted in the at least one hanging mount.

22. The blind system of claim 14, wherein:
the at least one directional vent includes a plurality of directional vents each located in a lower region of the one or more walls with the outlet facing downward;
the outlet and the inlet include an opening system that is openable and closable to a selected size; and
the at least one oxidant generator mount is located above and adjacent to the inlet of some of the at least one directional vent on the inner surface.

23. The blind system of claim 14, wherein the at least one portable oxidant generator includes at least one ozone generator.

24. A method of controlling scent in and around a hunting blind, the method comprising:
occupying a hunting blind, the hunting blind including:
one or more walls defining an interior region therebetween, the one or more walls including an inner surface and an outer surface;
a roof at least partially enclosing the interior region;
one or more windows in the one or more walls;
at least one directional vent disposed on the one or more walls or the roof, the at least one directional vent including:
an inlet on the inner surface; and
an outlet facing downward on the outer surface, the outlet being in fluidly connected with the inlet by an opening therebetween;
at least one oxidant generator mount on one or more of the roof or the one or more walls; and
operating at least one portable oxidant generator positionally oriented on the at least one oxidant generator mount to flow oxidant output directly into the inlet of the at least one directional vent, bypassing the interior region of the hunting blind.

25. The method of claim 24, wherein operating at least one portable oxidant generator disposed in the at least one oxidant generator mount includes controlling output of the at least one portable oxidant generator.

26. The method of claim 24, wherein operating at least one portable oxidant generator disposed in the at least one oxidant generator mount includes turning on a first portable oxidant generator disposed on the one or more walls and a second portable oxidant generator disposed on the roof.

27. The method of claim 24, wherein operating at least one portable oxidant generator disposed in the at least one oxidant generator mount includes:
   intaking air from the interior region into the at least one portable oxidant generator;
   treating the air with oxidant produced in the at least one portable oxidant generator; and
   outputting the treated air outside of the blind through the at least one directional vent.

28. The method of claim 24, wherein:
   the at least one directional vent includes a plurality of directional vents each located in a lower region of the one or more walls with the outlet facing downward;
   the outlet and the inlet of the at least one directional vent includes an opening system that is openable and closable to a selected size; and
   the at least one oxidant generator mount is located above and adjacent to the inlet of some of the at least one directional vent on the inner surface.

29. The method of claim 24, wherein operating at least one portable oxidant generator disposed in the at least one oxidant generator mount includes turning on the at least one portable oxidant generator.

30. The method of claim 24, wherein:
   the at least one portable oxidant generator includes a plurality of portable oxidant generators; and
   operating at least one portable oxidant generator disposed in the at least one oxidant generator mount includes turning on two or more of the plurality of portable oxidant generators.

31. The method of claim 24, wherein the outlet and the inlet include an opening system that is openable to a selected size.

32. The method of claim 31, further comprising opening one or more of the inlet or the outlet to the selected size effective to allow air flow therethrough.

33. The method of claim 24, wherein the at least one directional vent includes one or more roof vents directed outward from the roof and the one or more walls.

34. The method of claim 33, wherein the one or more roof vents are connected to the at least one oxidant generator mount located on the roof.

35. The method of claim 34, wherein operating at least one portable oxidant generator disposed in the at least one oxidant generator mount includes:
   intaking air from the interior region into the at least one portable oxidant generator;
   treating the air with oxidant produced in the at least one portable oxidant generator; and
   outputting the treated air outside of the blind through the one or more roof vents.

36. The method of claim 24, further comprising disposing the at least one portable oxidant generator in the at least one oxidant generator mount.

* * * * *